(12) United States Patent
Humfeld et al.

(10) Patent No.: US 12,337,994 B2
(45) Date of Patent: Jun. 24, 2025

(54) INTEGRALLY STIFFENED BONDED PANEL WITH MACHINED RECESSES AND IMPROVED METHODS OF MANUFACTURE

(71) Applicant: The Boeing Company, Arlington, VA (US)

(72) Inventors: Keith Daniel Humfeld, Federal Way, WA (US); Joseph Andrew Bolton, Newalla, OK (US)

(73) Assignee: THE BOEING COMPANY, Arlington, VA (US)

(*) Notice: Subject to any disclaimer, the term of this patent is extended or adjusted under 35 U.S.C. 154(b) by 0 days.

(21) Appl. No.: 18/348,900

(22) Filed: Jul. 7, 2023

(65) Prior Publication Data
US 2023/0365274 A1 Nov. 16, 2023

Related U.S. Application Data

(63) Continuation of application No. 16/658,459, filed on Oct. 21, 2019, now Pat. No. 11,724,823.

(51) Int. Cl.
*B64F 5/10* (2017.01)
*B29C 70/54* (2006.01)
(Continued)

(52) U.S. Cl.
CPC .............. *B64F 5/10* (2017.01); *B29C 70/545* (2013.01); *B64C 3/26* (2013.01);
(Continued)

(58) Field of Classification Search
CPC ......... B29C 70/00; B29C 70/06; B29C 70/08; B29C 70/304; B29C 70/50; B29C 70/545;
(Continued)

(56) References Cited

U.S. PATENT DOCUMENTS

| | | |
|---|---|---|
| 3,265,556 A | 8/1966 | Hungerford |
| 4,934,580 A | 6/1990 | Sutton |

(Continued)

FOREIGN PATENT DOCUMENTS

| | | |
|---|---|---|
| CN | 101970215 A | 2/2011 |
| CN | 102046465 A | 5/2011 |

(Continued)

OTHER PUBLICATIONS

Chinese Office Action issued Aug. 31, 2023 in re Chinese Application No. 202011133813X filed Oct. 21, 2020.

(Continued)

*Primary Examiner* — Zachary M Davis
(74) *Attorney, Agent, or Firm* — COATS & BENNETT, PLLC

(57) ABSTRACT

Methods for machining a composite material substrate are discloses comprising integrating a predetermined pattern area having a disbond material for the purpose of creating a disbond region into the composite material substrate at a predetermined thickness, detecting the disbond region and forming a plurality of recesses in the composite material substrate by removing a machined plug from the composite material substrate to form recesses positioned at locations corresponding to the predetermined pattern area, and composite components comprising the recesses machined according to such methods.

20 Claims, 13 Drawing Sheets

(51) Int. Cl.
  *B64C 3/26* (2006.01)
  *B23K 101/00* (2006.01)
  *B29K 63/00* (2006.01)
  *B29K 307/04* (2006.01)
  *B29L 31/30* (2006.01)

(52) U.S. Cl.
  CPC .................... *B23K 2101/006* (2018.08); *B29C 2793/0009* (2013.01); *B29K 2063/00* (2013.01); *B29K 2307/04* (2013.01); *B29L 2031/3085* (2013.01)

(58) Field of Classification Search
  CPC .... B32B 3/00; B32B 3/02; B32B 3/10; B32B 3/12; B32B 3/26; B32B 3/30; B64C 1/12; B64C 3/26; B64F 5/10
  See application file for complete search history.

(56) References Cited

U.S. PATENT DOCUMENTS

| | | |
|---|---|---|
| 6,358,590 B1 | 3/2002 | Blair et al. |
| 7,097,731 B2 | 8/2006 | Puriefoy et al. |
| 9,180,629 B2 | 11/2015 | Ender |
| 11,338,903 B2 | 5/2022 | Anderson et al. |
| 2004/0140049 A1 | 7/2004 | Puriefoy et al. |
| 2007/0166581 A1 | 7/2007 | Terazaki et al. |
| 2012/0040159 A1 | 2/2012 | Pechnik |
| 2016/0167763 A1 | 6/2016 | Brakes |
| 2016/0168441 A1 | 6/2016 | Maisonnave et al. |
| 2016/0325820 A1 | 11/2016 | Evans |
| 2017/0306466 A1 | 10/2017 | Meyer et al. |
| 2018/0281923 A1 | 10/2018 | Walker et al. |
| 2020/0101690 A1 | 4/2020 | Oishi et al. |

FOREIGN PATENT DOCUMENTS

| | | |
|---|---|---|
| CN | 102481971 A | 5/2012 |
| CN | 102666076 A | 9/2012 |
| CN | 105216380 A | 1/2016 |
| CN | 109822931 A | 5/2019 |
| EP | 2263863 A2 | 12/2010 |
| EP | 3210882 A1 | 8/2017 |
| GB | 1317779 A | 5/1973 |
| JP | 2016060112 A | 4/2016 |

OTHER PUBLICATIONS

CN Office Action issued Feb. 28, 2025 in re CN Application No. 202011132484.7.

INTEGRALLY STIFFENED BONDED PANEL WITH MACHINED RECESSES AND IMPROVED METHODS OF MANUFACTURE

RELATED APPLICATIONS

This application is a continuation application of U.S. patent application Ser. No. 16/658,459 filed Oct. 21, 2019, issued Aug. 15, 2023 as U.S. Pat. No. 11,724,823, the disclosure of which is incorporated by reference herein in its entirety as if made part of the present application.

TECHNOLOGICAL FIELD

The present disclosure relates generally to the field of composite materials, and structures and components made from composite materials. More specifically, the present disclosure relates to the field of machining composite materials for use as composite material components, without compromising the strength of the composite materials, and manufacturing composite components using the machined composite materials.

BACKGROUND

Aircraft structures, including, for example, wing structures typically include a complex assembly that includes stringer, rib, spars, etc. as reinforcement structures in the interior of the wing assembly. Ribs are typically spatially arranged perpendicularly along the longitudinal length of the wing interior. Stringers are typically connected to the wing skin, with ribs and spars connected to stringer assemblies to form a reinforced wing box assembly with desired strength and rigidity. The stringers typically extend along the longitudinal length of the wing interior.

Aircraft wings constructed with reinforcing stingers, ribs, and fasteners are costly on a component level, and can further increase overall cost of a wing assembly process, and further increase the overall cost of structures incorporating such components and assemblies. Further, interior wing components that are typically used as wing reinforcements, and the fasteners used to connect the reinforcements add considerable weight to the wing assembly and add to the overall weight of the aircraft comprising such wing assemblies.

SUMMARY

According to a present aspect, a method is disclosed including orienting a plurality of composite material layers onto a tool to form a composite material substrate, with the composite material substrate having a composite material substrate thickness, and with the tool having a tooling surface. The composite material substrate further includes a composite material substrate first surface (e.g. composite material substrate first surface first side) and a composite material substrate second surface (e.g. composite material substrate first surface second side), with the composite material substrate first surface positioned proximate to the tooling surface. The method further includes introducing a predetermined pattern area to the composite material substrate, with the predetermined pattern area configured to be introduced to the composite material substrate at a predetermined distance from the composite material substrate second surface at a location within the composite material substrate thickness, and at least partially curing the composite material substrate, to form an amount of at least partially cured composite material substrate, with the at least partially cured composite material substrate configured to extend from the composite material substrate second surface to the predetermined distance into the composite material substrate to form a predetermined amount of an at least partially cured composite material substrate. The method further includes removing at least a portion of the predetermined amount of the at least partially cured composite material substrate from the composite material substrate to the predetermined distance from the composite material second surface and into the composite material substrate thickness to form a predetermined pattern of recesses in the at least partially cured composite material substrate, with the predetermined pattern of recesses substantially matching the predetermined pattern area.

In another aspect, introducing the predetermined pattern area into the composite material substrate further includes, at least partially curing the predetermined pattern area into the composite material substrate.

In a further aspect, introducing the predetermined pattern area into the composite material substrate further includes, chemically treating the predetermined pattern area into the composite material substrate.

In another aspect, introducing a plurality of predetermined pattern areas to the composite material substrate further includes, laying up an intermediate layer into the composite material substrate, with the intermediate layer layed up into the composite material substrate at the predetermined distance from the composite material substrate second surface, and with the intermediate layer comprising the predetermined pattern area.

In a further aspect, the at least partially curing the composite material substrate further includes orienting a heat blanket proximate to the composite material substrate second surface, with the heat blanket comprising a plurality of heating zones, and with the plurality of heating zones configured to at least partially cure the composite material substrate to a predetermined curing thickness, and the plurality of heating zones configured to at least partially cure the composite material substrate to form an at least partially cured predetermined pattern area into the composite material substrate.

In another aspect, the composite material layers include a fiber-containing epoxy-based composite material.

In a further aspect, the composite material layers include a carbon fiber-containing epoxy-based composite material.

In another aspect, the at least partially cured predetermined pattern area comprises a porosity value that is different than the porosity value of the composite material substrate.

In another aspect, the method further comprises chemically treating the predetermined pattern area into the composite material substrate by applying a chemical agent during manufacture of the composite material substrate at a location within the composite material substrate thickness to form the predetermined pattern area.

In another aspect, the at least partially cured predetermined pattern area has a porosity value that is different than the porosity value of the composite material substrate.

In a further aspect, the intermediate layer is configured to form a predetermined disbond pattern area.

According to another aspect, a method is disclosed including providing a heterogeneous composite material substrate having a heterogeneous composite material substrate surface, said heterogeneous composite material substrate further having a predetermined composite material substrate thickness, with the heterogeneous composite material substrate further including a composite material substrate first region comprising a first porosity value and a second region located adjacent to the composite material substrate first region, with the second region comprising a second porosity value, and with the second region positioned within the predetermined composite material substrate thickness at a predetermined distance from the heterogeneous composite material substrate surface. The method further includes at least partially curing a predetermined area of the composite material substrate first region, with the predetermined area of the composite material substrate first region configured to extend from the heterogeneous composite material substrate surface to the second region to form a predetermined amount of at least partially cured composite material substrate first region. The method further includes orienting a material removal device proximate to the heterogeneous composite material substrate surface and determining the location of a first region composite material substrate/second region interface present in the heterogeneous composite material substrate. The method further includes removing a predetermined amount of the at least partially cured first region composite material substrate from the heterogenous composite material substrate, with the predetermined amount of at least partially cured first region composite material substrate extending from the heterogeneous composite material substrate surface to the first region composite material/second region interface.

In another aspect, the present disclosure is directed to a composite laminate including a composite material substrate configured to comprise a plurality of recesses extending from a composite material substrate surface to a predetermined distance into the composite material substrate, said recesses comprising a predetermined dimension, an intermediate layer disposed at a predetermined depth within the composite material substrate, with the intermediate layer comprising an intermediate layer first surface and an intermediate layer second surface, wherein said recesses are bounded by surrounding composite material substrate and the intermediate layer first surface, and wherein said intermediate layer comprises a disbond material.

In another aspect, the present disclosure is directed to a vehicle including a composite laminate, with the composite laminate including a composite material substrate configured to comprise a plurality of recesses extending from a composite material substrate surface to a predetermined distance into the composite material substrate, said recesses comprising a predetermined dimension, an intermediate layer disposed at a predetermined depth within the composite material substrate, with the intermediate layer comprising an intermediate layer first surface and an intermediate layer second surface, wherein said recesses are bounded by surrounding composite material substrate and the intermediate layer first surface, and wherein said intermediate layer comprises a disbond material.

In another aspect, the vehicle includes at least one of a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface water borne vehicle; an unmanned surface water borne vehicle; a manned subsurface waterborne vehicle; an unmanned sub-surface waterborne vehicle; or combinations thereof.

In a further aspect, a wing assembly is disclosed, with the wing assembly including a composite laminate, with the composite laminate including a composite material substrate configured to comprise a plurality of recesses extending from a composite material substrate surface to a predetermined distance into the composite material substrate, said recesses comprising a predetermined dimension, an intermediate layer disposed at a predetermined depth within the composite material substrate, with the intermediate layer comprising an intermediate layer first surface and an intermediate layer second surface, wherein said recesses are bounded by surrounding composite material substrate and the intermediate layer first surface, and wherein said intermediate layer comprises a disbond material. In a further aspect, the wing assembly can be a wing assembly inner skin.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
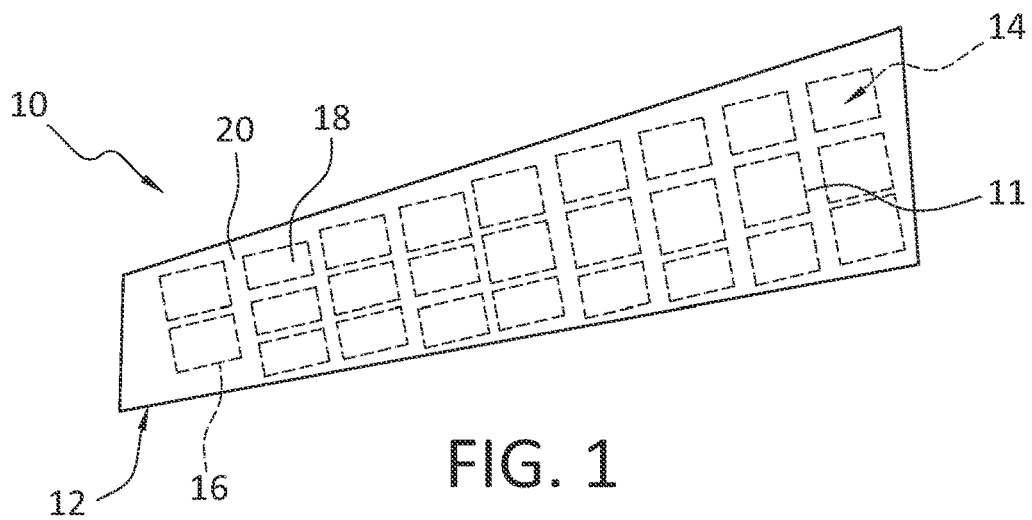
Figure 2A:
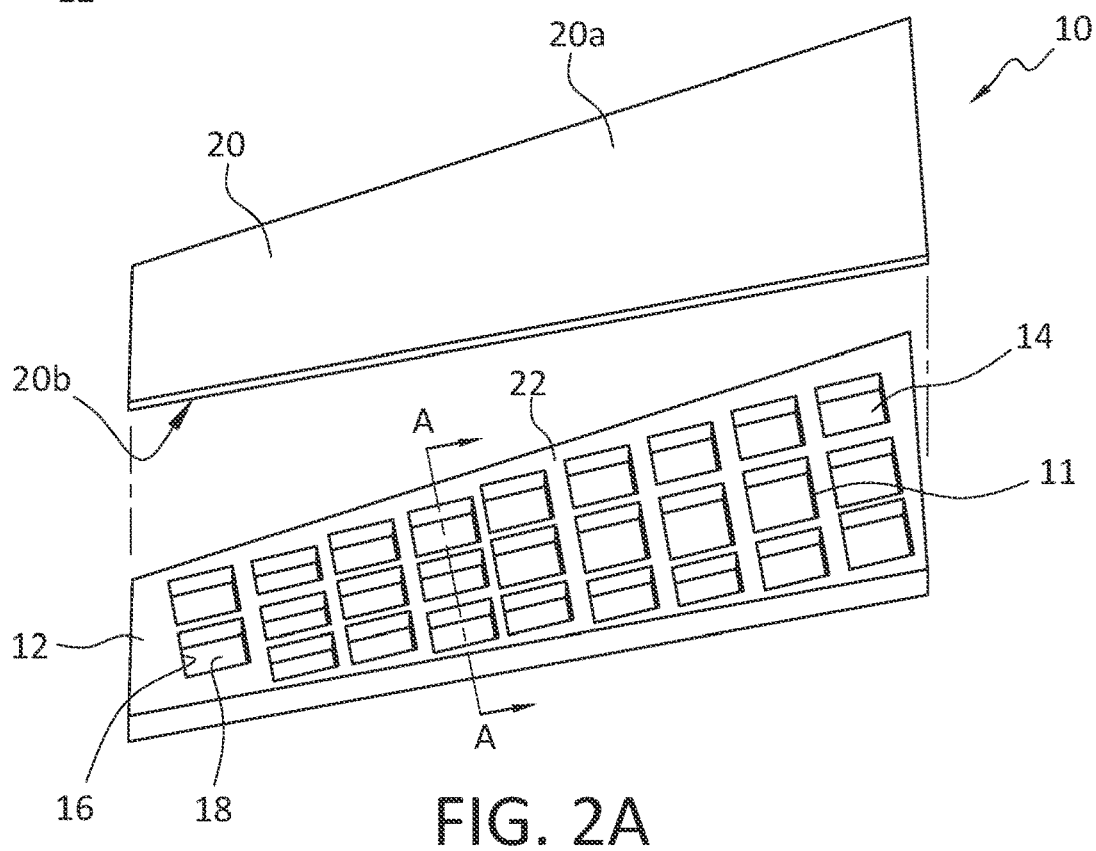
Figure 2B:
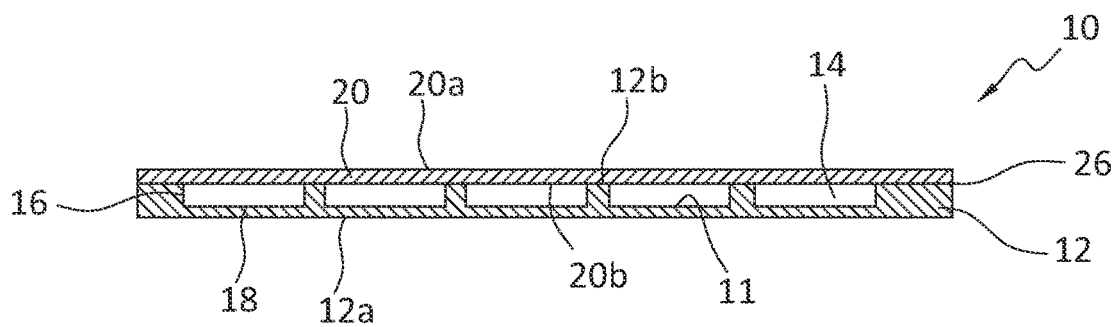
Figure 3:
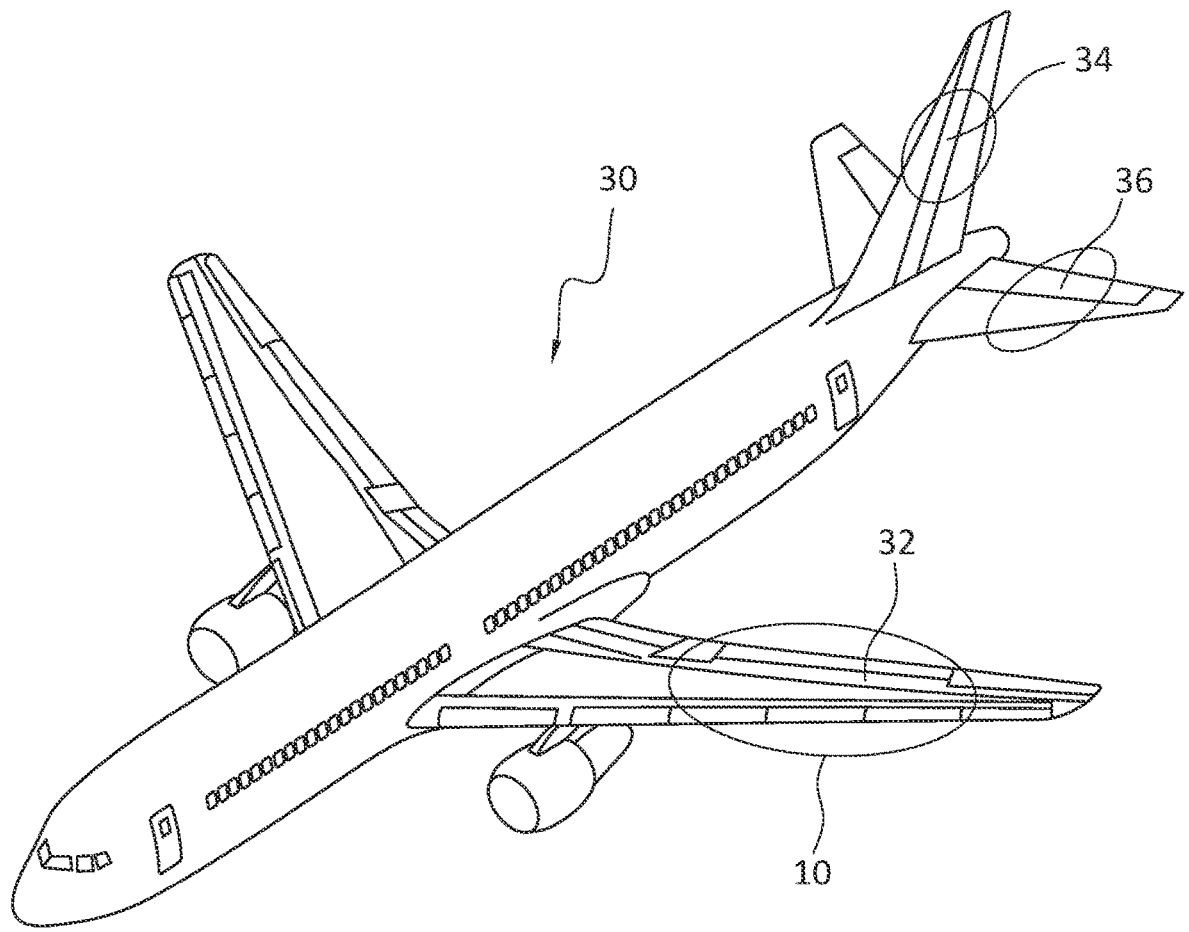
Figure 4A:
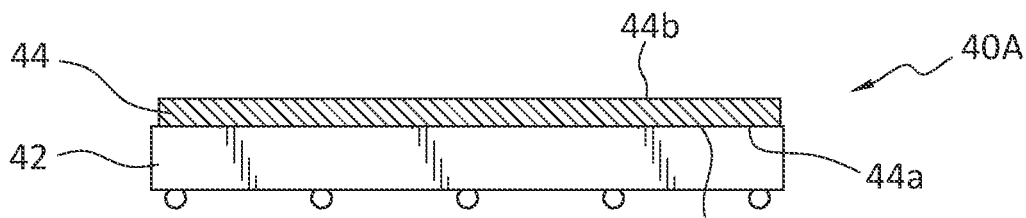
Figure 4B:
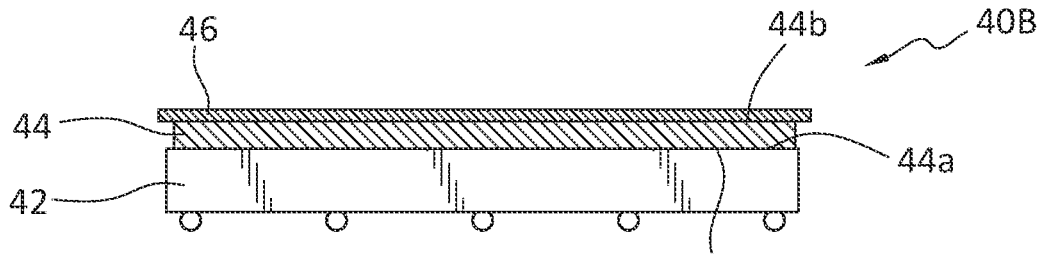
Figure 4C:
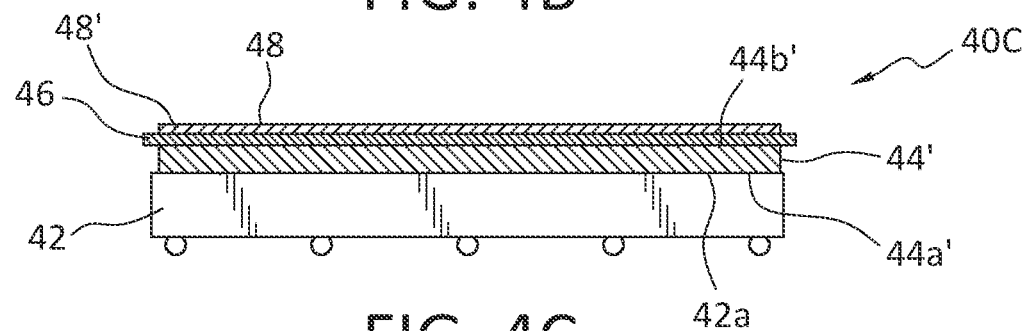
Figure 4D:
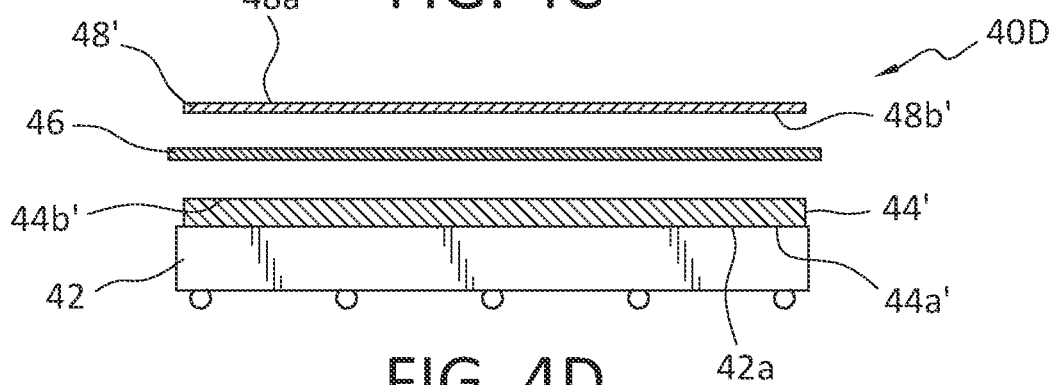
Figure 4E:
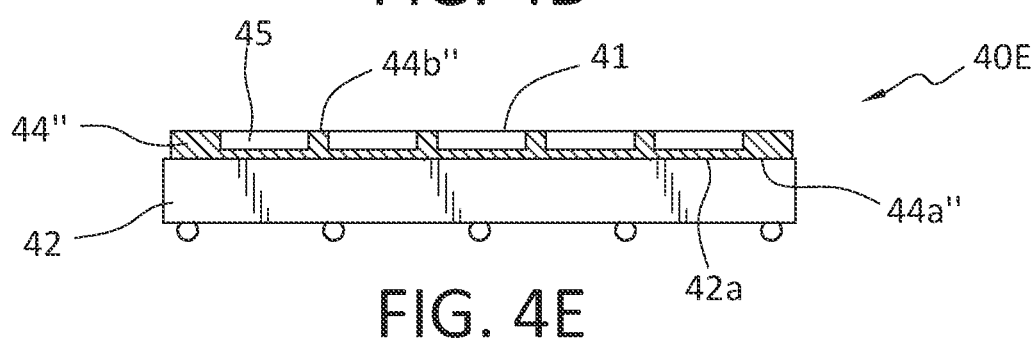
Figure 5:
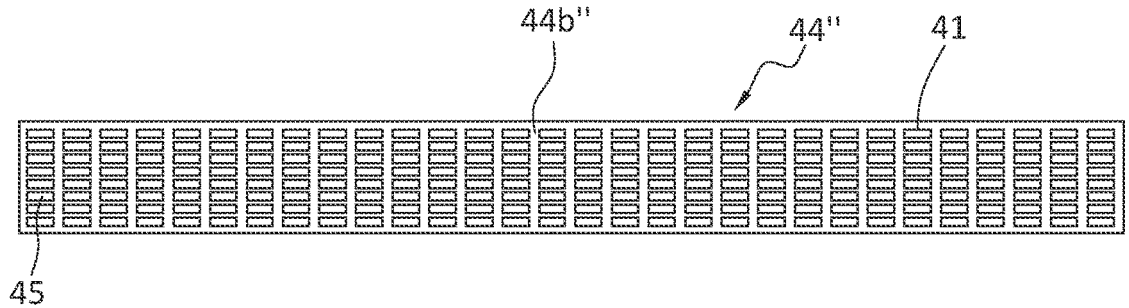
Figure 6A:
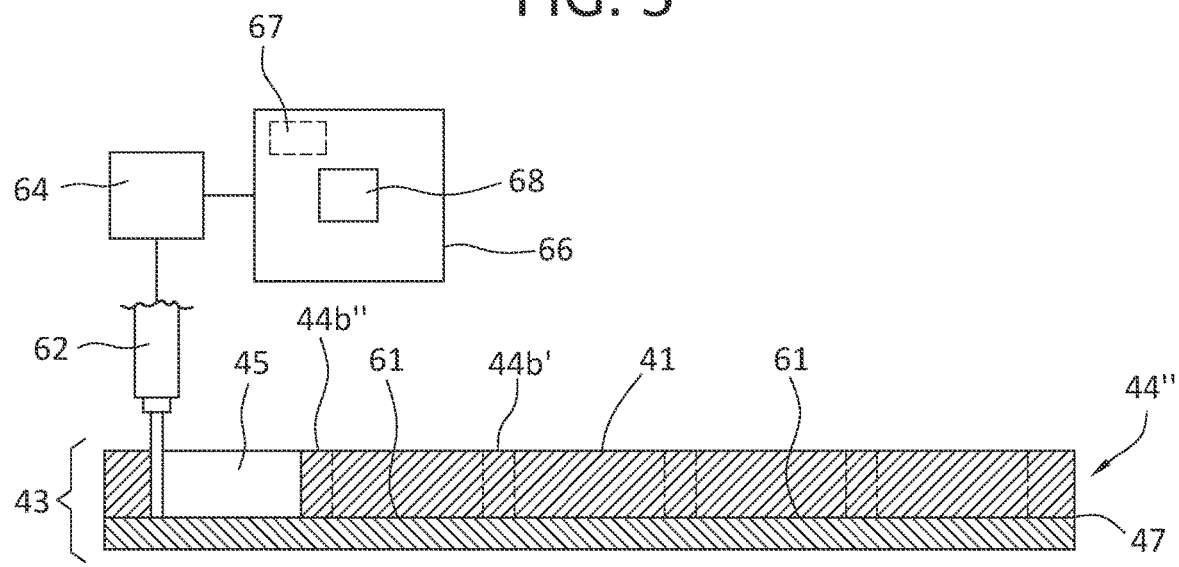
Figure 6B:
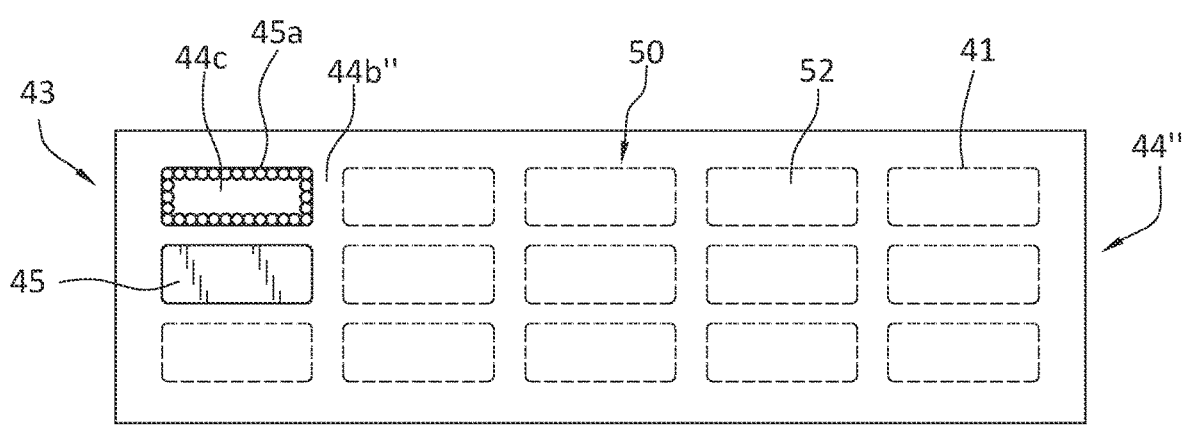
Figure 7:
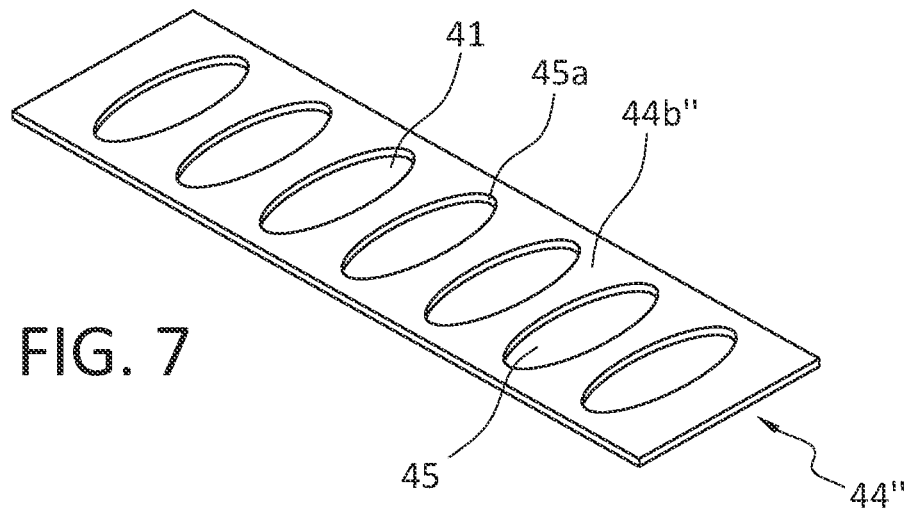
Figure 8:
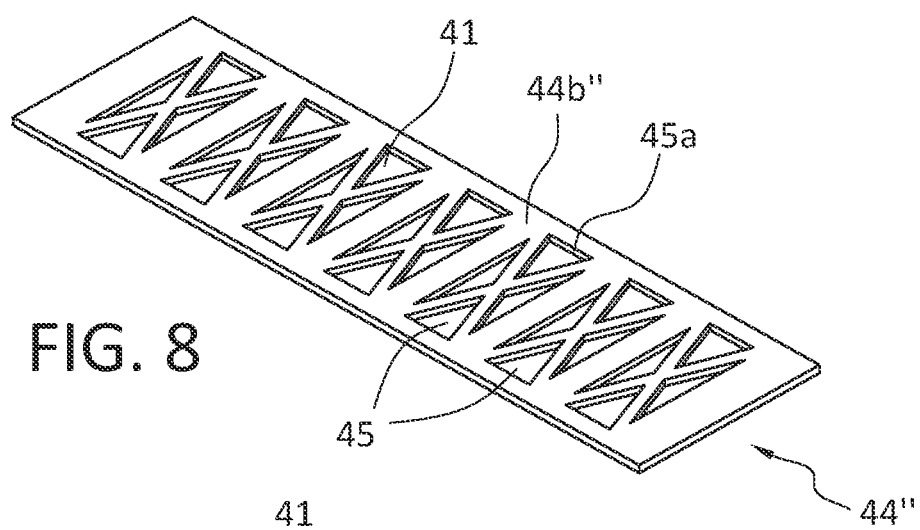
Figure 9:
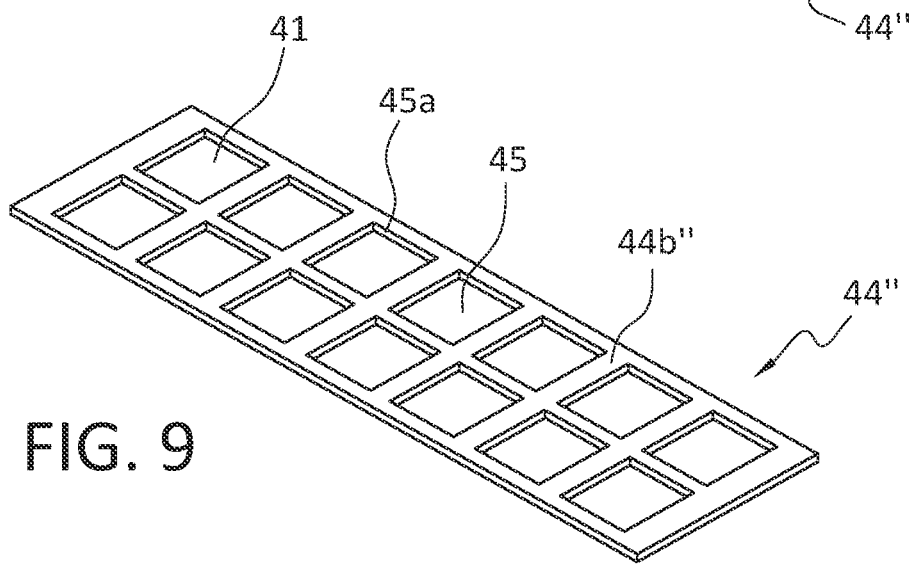
Figure 10A:
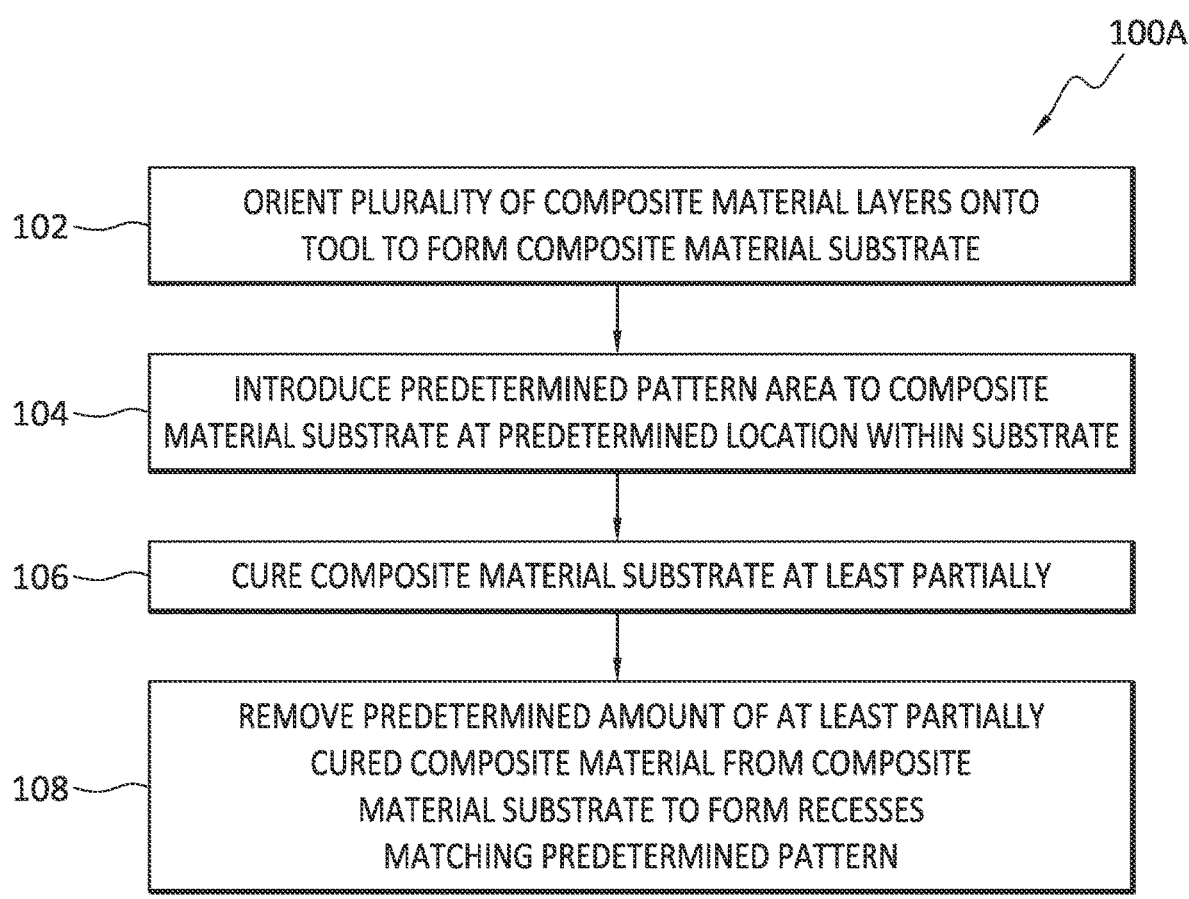
Figure 10B:
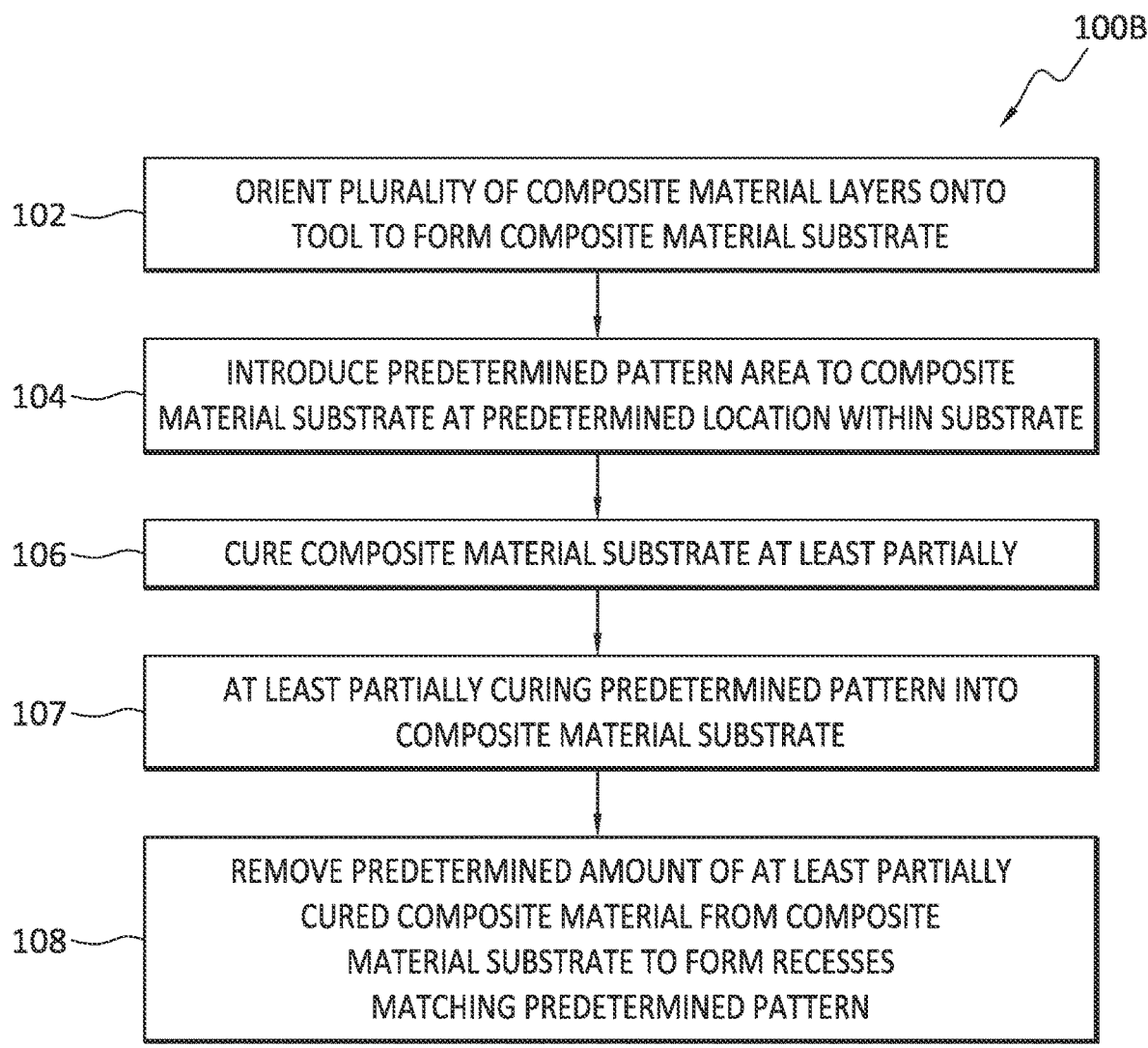
Figure 10C:
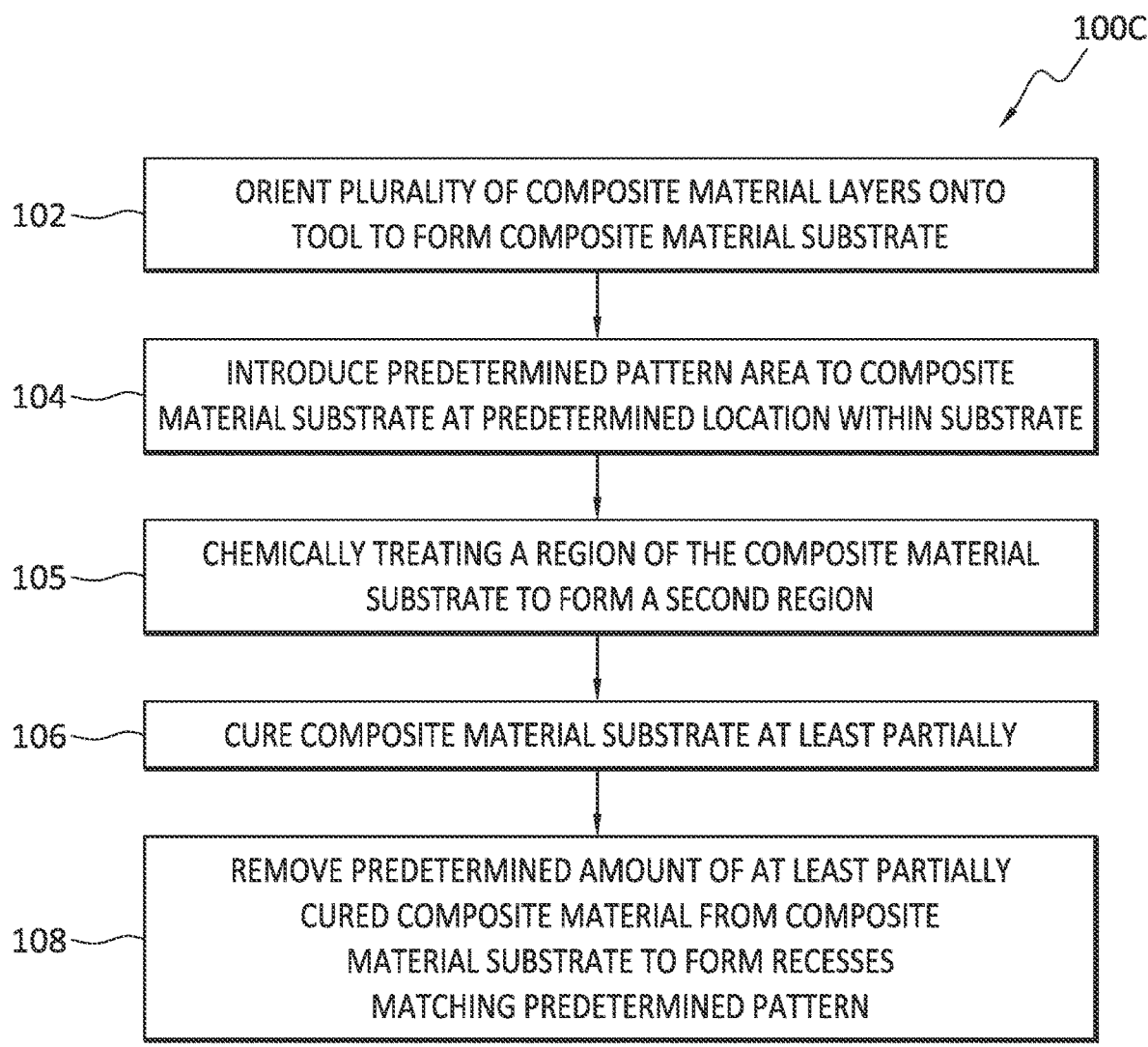
Figure 11:
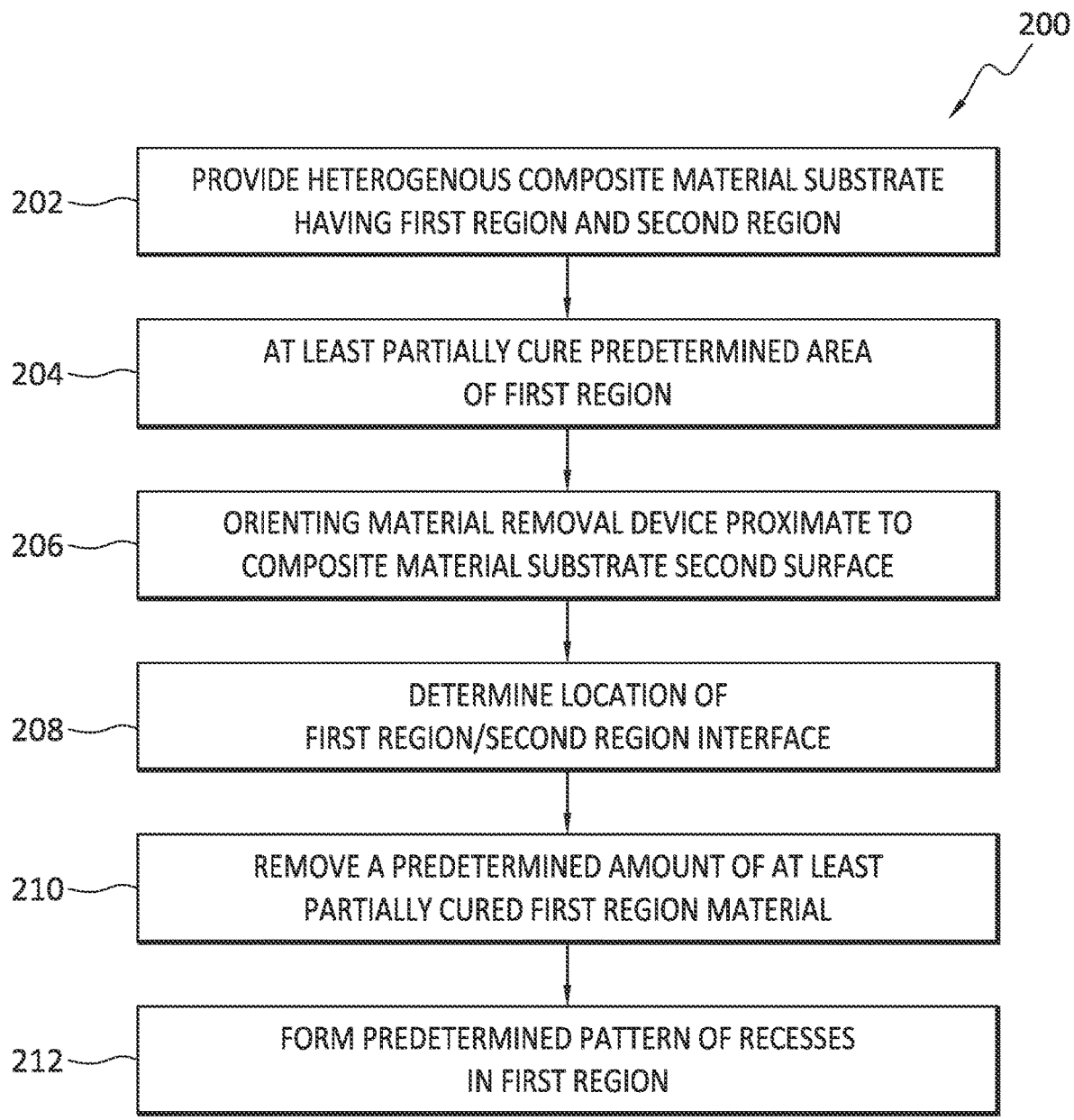
Figure 12:
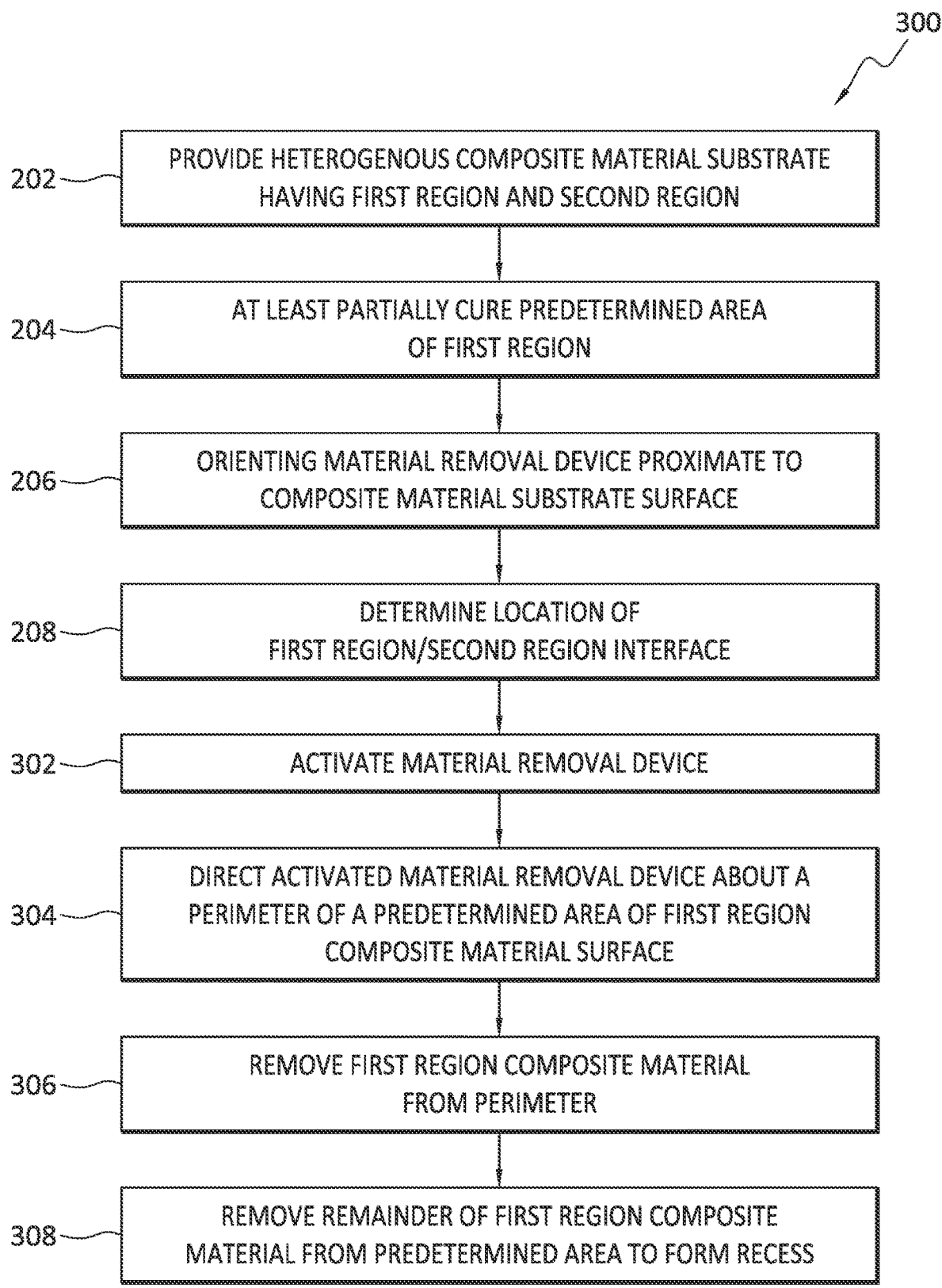
Figure 13:
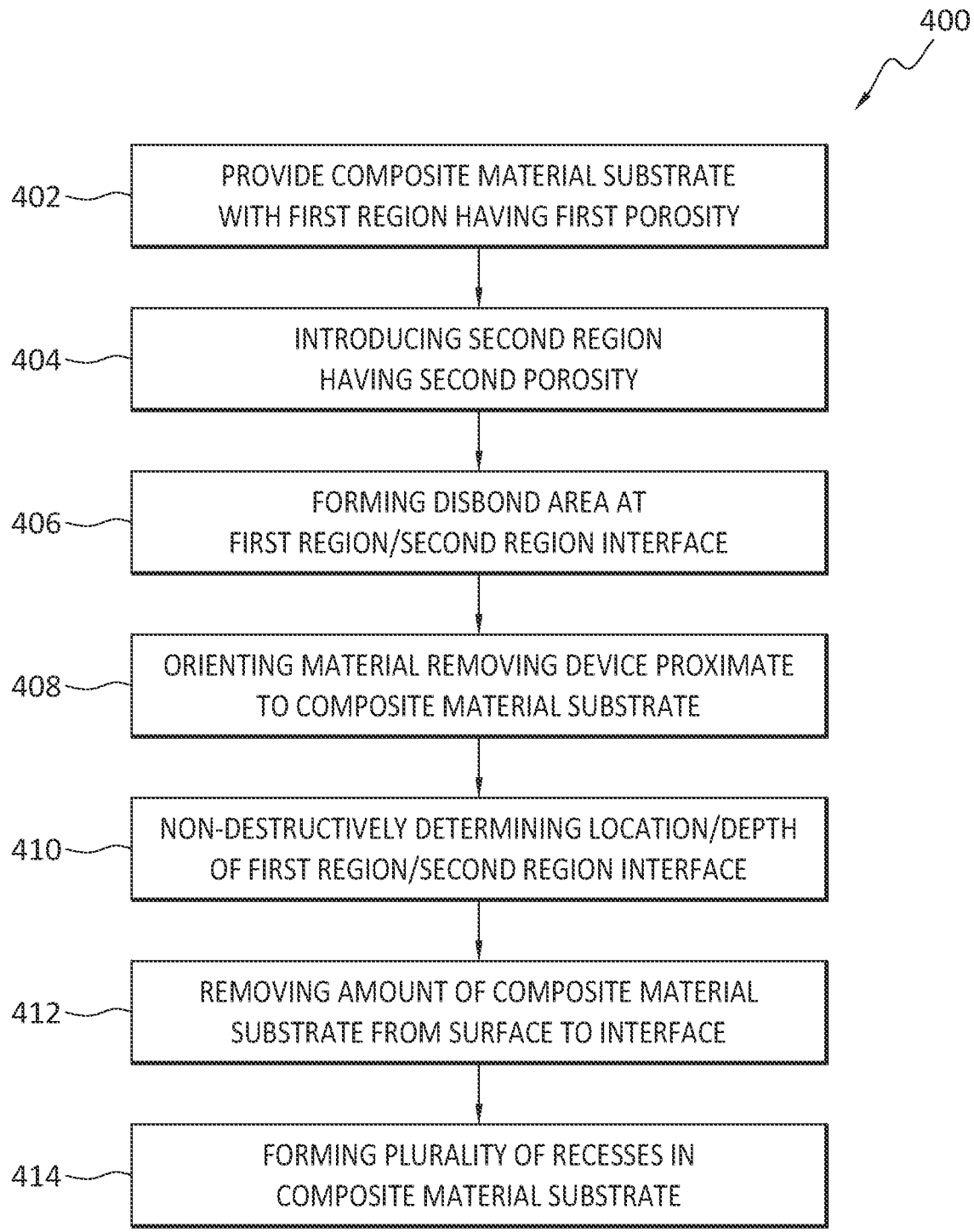
Figure 14:
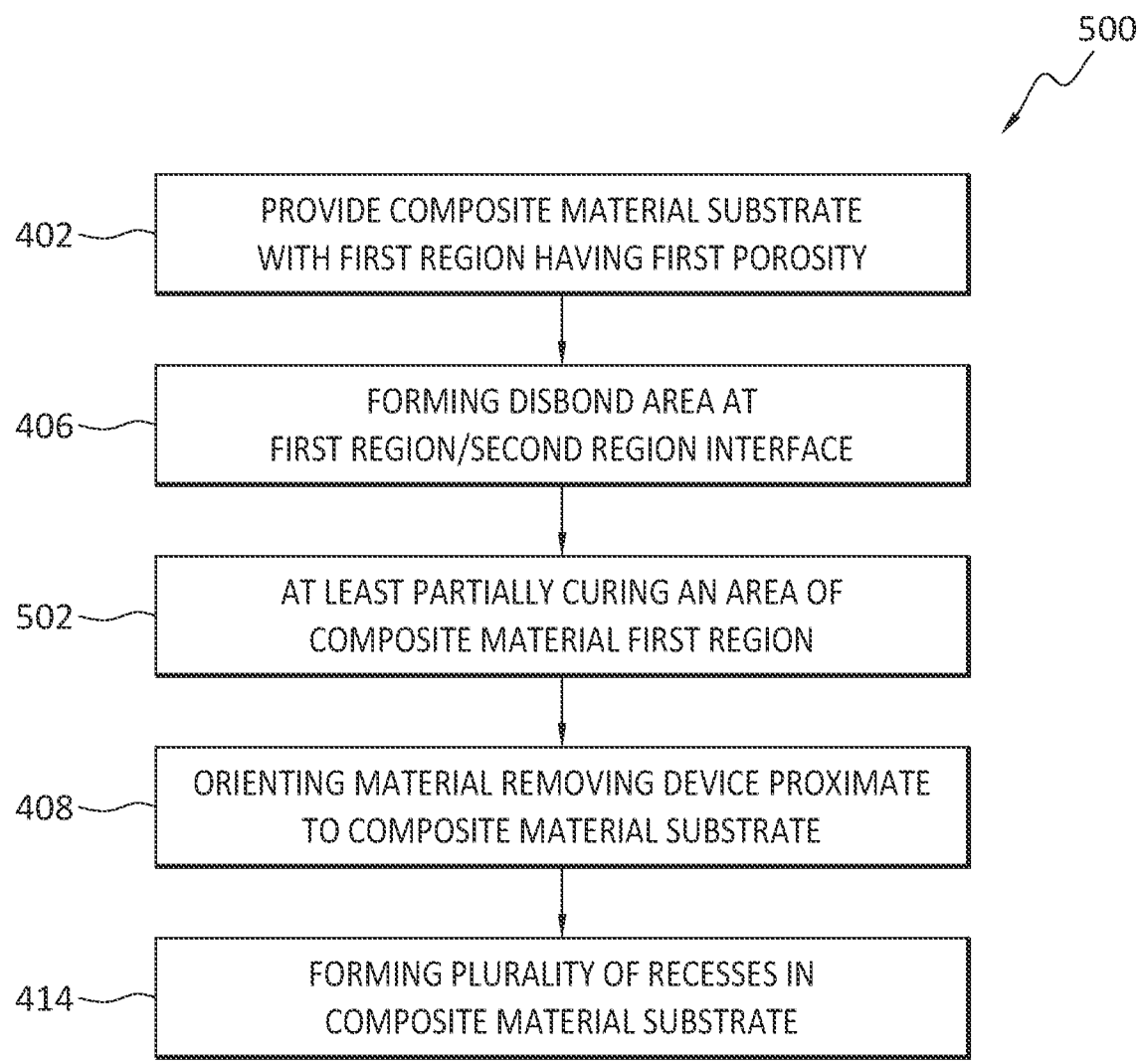

Having thus described variations of the disclosure in general terms, reference will now be made to the accompanying drawings, which are not necessarily drawn to scale, and wherein:

FIG. 1 is an illustration of a wing assembly according to present aspects;

FIG. 2A is a perspective view of a wing assembly construction according to present aspects;

FIG. 2B is a cross-sectional view of the wing assembly of FIG. 1 according to present aspects;

FIG. 3 is an illustration of an aircraft comprising a wing assembly according to present aspects;

FIG. 4A is a side view of a manufacturing stage according to present aspects;

FIG. 4B is a side view of a manufacturing stage according to present aspects;

FIG. 4C is a side view of a manufacturing stage according to present aspects;

FIG. 4D is a side view of a manufacturing stage according to present aspects;

FIG. 4E is a side view of a manufacturing stage according to present aspects;

FIG. 5 is an overhead view of a machined composite substrate material according to present aspects;

FIG. 6A is a cross-sectional side view of a composite material substrate machined to form a recess in the composite material substrate thickness according to present aspects;

FIG. 6B is an overhead view of a portion of the composite material substrate of FIG. 6A showing a plurality of recesses to be machined into the composite material substrate, according to present aspects;

FIG. 7 is a perspective view of a machined composite material substrate having a plurality of recesses having a geometric profile that includes a predetermined pattern of ellipses, according to present aspects;

FIG. 8 is a perspective view of a machined composite material substrate having a recess geometric profile that includes a predetermined pattern of triangles, according to present aspects;

FIG. 9 is a perspective view of a machined composite material substrate having a recess geometric profile that includes a predetermined pattern of rectangles, according to present aspects;

FIG. 10A is a flowchart outlining a method according to present aspects;

FIG. 10B is a flowchart outlining a method according to present aspects;

FIG. 10C is a flowchart outlining a method according to present aspects;

FIG. 11 is a flowchart outlining a method according to present aspects;

FIG. 12 is a flowchart outlining a method according to present aspects;

FIG. 13 is a flowchart outlining a method according to present aspects;

FIG. 14 is a flowchart outlining a method according to present aspects; and

Figure 15:
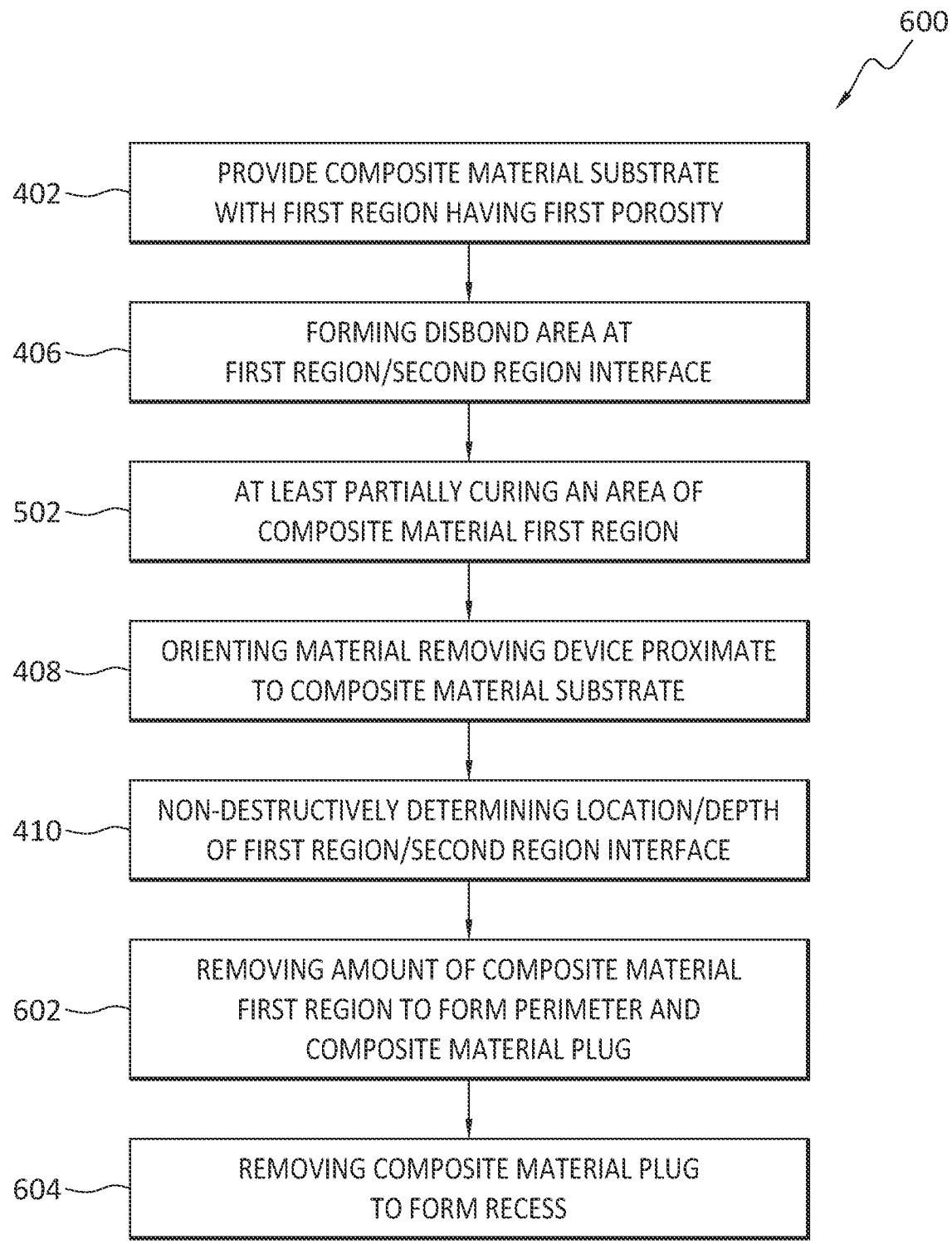

FIG. 15 is a flowchart outlining a method according to present aspects.

DETAILED DESCRIPTION

Aspects of the present disclosure are directed to a composite material construction that can be a two-piece construction where one piece can be a composite material substrate that is machined to form a machined composite material substrate with portion of the composite material substrate removed by a material removal device to form a predetermined pattern of removed material. The removed material can form at least one recess in the composite material substrate. The machined composite material substrate is then bonded to a composite material top layer with the at least one recess covered by the composite material top layer.

FIG. 1 shows an overhead perspective view of a composite assembly shown in the form of a non-limiting wing assembly that can be configured for attachment to an aircraft (shown in FIG. 3). As shown in FIG. 1, composite component 10, shown in FIG. 1 in the form of an exemplary wing assembly. Composite component 10 includes a 2-piece assembly comprising a composite material substrate 12 comprising recesses 14 that appear in the composite material substrate 12 in a predetermined pattern 11, with the recesses each further comprising a predetermined geometric profile (shown in FIG. 1 as a predetermined pattern of rectangles). As further shown in FIG. 1, the wing assembly 10 further comprises a composite material top layer 20 that is fixedly attached to the composite material substrate 12.

FIG. 2A is a perspective view of the composite component 10 shown in FIG. 1. As shown in FIG. 2A, composite component 10 is again shown in the exemplary form of a wing assembly and includes a 2-piece assembly comprising composite material substrate 12 that further comprises recesses 14 that appear in composite material substrate 12 in a predetermined pattern 11, with the recesses each further comprising a predetermined geometric profile (shown in FIG. 1 as a predetermined pattern of rectangles). FIG. 2A further shows composite material top layer 20 including composite material top layer first side 20a and composite material top layer second side 20b.

FIG. 2B is a cross-sectional view of the composite assembly shown in FIG. 1 taken across line "A-A". As shown in FIG. 2B composite component 10 is again shown in the exemplary form of a wing assembly and includes a 2-piece assembly comprising a composite material substrate 12. Composite material substrate further comprises a composite substrate material first side 12a, a composite substrate material second side 12b, and recesses 14. As shown in FIGS. 1, 2A, and 2B, recesses 14 appear in the composite material substrate 12 in a predetermined pattern 11, with the recesses 14 each further comprising a predetermined geometric profile (shown in FIGS. 1, 2A and 2B as a predetermined pattern of rectangles). As further shown in FIG. 2B, composite component 10 further comprises a composite material top layer 20 that is fixedly attached to the composite material substrate 12. Composite material top layer 20 comprises a composite material top layer first side 20a and a composite material top layer second side 20b. Recesses 14 are shown as bounded by recess wall 18, recess floor 16, and composite material top layer second side 20b. As shown in FIG. 2B, an adhesive material layer 26 is interposed between composite substrate material second side 12b and composite material top layer second side 20b.

FIG. 3 is a representative illustration of a vehicle 30, in the non-limiting form of an aircraft, showing wing 32 comprising composite component 10 of the type disclosed herein and, for example, as shown in any of FIGS. 1, 2, and 3. While the composite material substrate is shown in the accompanying FIGS. incorporated into a wing assembly for an aircraft, according to present aspects, composite components incorporating the machined composite material substrates with recesses machined into the composite material substrates can be used in the manufacture of other aircraft and other vehicle components including, for example, tail section vertical stabilizer 34, tail section horizontal stabilizer 36, etc.) in addition to assemblies in, for example, vehicles including, without limitation a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface water borne vehicle; an unmanned surface water borne vehicle; a manned sub-surface waterborne vehicle; an unmanned sub-surface waterborne vehicle; or combinations thereof.

FIGS. 4A, 4B, 4C, 4D, and 4E (collectively referred to herein as FIGS. 4A-4E) represent an illustrative progression of material manufacturing stages (e.g., five stages shown as first stage 40A, second stage 40B, third stage 40C, fourth stage 40D, and fifth stage 40E), in the manufacture of the presently disclosed composite components, and according to present aspects. As shown in FIG. 4A, initial, or first stage 40A shows a molding tool 42 having a molding tool surface 42a onto which is deposited (to a predetermined thickness) a predetermined amount of uncured composite material substrate 44. Composite material substrate has a composite material substrate first side 44a in contact with the molding tool 42, and a composite material substrate second side 44b. According to present aspects, a predetermined thickness of uncured composite material substrate 44 is deposited onto molding tool 42 to form a predetermined thickness of cured composite material substrate while accounting for composite material shrinkage during curing. According to present aspects, non-limiting representative composite materials for use in making the composite material substrate and the composite material substrate and/or the composite material top layer can include resin-containing materials such as, for example, diglycidyl ethers of bisphenol A; dicglycidyl ethers of bisphenol F; N,N,N',N'-tetragylcidyl-4,4'-diaminophenylmethane; p-aminophenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, etc., and combinations thereof. According to further aspects, non-limiting fiber components of fiber-containing materials include carbon fibers, boron fibers, glass fibers, aramid fibers, etc., and combinations thereof.

In another aspect, the composite material layers include a fiber-containing epoxy-based composite material.

In a further aspect, the composite material layers include a carbon fiber-containing epoxy-based composite material.

The molding tool can alternately be referred to herein and otherwise include mandrels, and can be made of metals or non-metals and can be any device capable of supporting a composite material laminate lay-up (e.g., the lay-up comprising any predetermined number of individual composite material prepregs, etc.) and also capable imparting or transferring surface characteristics from a tooling surface to a surface of the composite laminate surface including, for example, an outer mold line or an inner mold line.

As shown in FIG. 4B, in second stage 40B a separator layer 46, that can be, for example, a caul plate, is oriented in position proximate to the composite material substrate second side 44b. The separator layer 46 can be a separator film or separator sheet, in combination with, or integrating a release material film or other release agent, etc. The separator layer deposited onto or otherwise oriented onto the composite material substrate second side 44b, such that the separator layer 46 is interposed between the composite material substrate second side 44b and the composite material top layer 48 (shown in FIG. 4C).

In the third stage 40C, shown in FIG. 4C, a composite material top layer 48 is deposited onto the separator layer 46. The separator layer in the form of, for example a separator sheet, in combination with a release material film or other release agent, etc., is deposited onto or otherwise positioned or otherwise interposed between the composite material top layer 48 and the composite material substrate 44. The separator layer 46 can be any layer, film, etc. that can act as a parting layer or parting plane for the purpose of facilitating the separation of layers after curing (e.g., separating the at least partially cured composite material top layer 48' from the at least partially cured composite material substrate 44'—e.g., as shown in FIG. 4D). According to presently disclosed methods, heat, or heat and pressure, are provided for the purpose of at least partially curing composite material substrate 44 and an at least partially curing the composite material top layer 48 to form an at least partially cured composite material substrate 44' and an at least partially cured composite material top layer 48' (for example, as shown in FIGS. 4C and 4D).

In the fourth stage shown in FIG. 4D, the at least partially cured composite material top layer 48' is separated from the at least partially cured composite material substrate 44'. As further shown in FIG. 4D, the at least partially cured composite material top layer 48' is removed from the now at least partially cured composite material substrate 44'. The at least partially cured composite material top layer 48' comprises an at least partially cured composite material top layer first side 48a' and an at least partially cured composite material top layer second side 48b'. As shown in FIG. 4D, after at least partially curing the composite layers, the layers can be separated and, according to one aspect, if the separator layer remains as a discrete layer, the separator layer is removed. In another aspect, during the separator layer can become indistinguishable from the surrounding layers, but the function of the separator layer is accomplished through curing such that the at least partially cured composite material top layer 48' and the at least partially cured composite material substrate 44' can be separated from one another. While the at least partially cured composite material substrate 44' is shown in FIGS. 4D and 4E as being retained in contact with the molding tool 42, according to present aspects, alternative manufacturing processes and stages include removing the at least partially cured composite material substrate 44' from the molding tool 42 after forming the at least partially cured composite material substrate 44'.

The fifth stage 40E is shown at FIG. 4E, where the at least partially cured composite material substrate 44' has been machined to form a machined composite material substrate 44" (comprising an at least partially cured composite material substrate first side 44a', and an at least partially cured composite material substrate second side 44b'). According to present aspects, and as will be later described more fully, the at least partially cured composite material substrate 44" is machined to form recesses in the at least partially cured composite material substrate 44'. The recesses 45 are shown extending from the at least partially cured and machined composite substrate material second side 44b" and into the substrate to a predetermined distance into the composite material substrate thickness. According to further aspects, the predetermined distances can be a substantially uniform predetermined distance across the composite material substrate, or the predetermined distance can vary such that the depth of the recesses differ.

While FIG. 4E is not drawn to scale, according to present aspects, the depth of the recesses can be any practical depth that will recognize and account for competing factors to be balanced, including weight reduction of the substrate through material removal (e.g. machining, etc.) and retained stiffness and/or strength of the machined composite material substrate. According to present aspects, the aforementioned factors to be balanced can be achieved by machining the recesses to a depth into the composite material substrate representing a distance from the surface (e.g., a depth distance, etc.) of from about one-half to about two-thirds of the total thickness of the composite substrate material. According to present aspects, the panel can experience a theoretical stiffness loss from the initial unmachined state to the final machined state. This theoretical stiffness loss is a relative stiffness loss, since much more weight is lost than stiffness. This results in the presents aspects achieving an increased stiffness-to-weight ratio (of the initial unmachined composite material substrate to the machined composite material substrate) through strategic machining. For example, depending on many variables and axis being referenced, according to present aspects, actual stiffness-to-weight ratio can be increased to 200% or more; comparing the initial unmachined composite material substrate stiffness-to-weight ratio to the machined composite material substrate stiffness-to-weight ratio. This calculation does not even take in account additional weight savings realized, according to present aspects, by obviating the need for other internal parts like ribs and stringers this structure type could replace For example, according to present aspects, a composite material substrate can have an initial material stiffness (per ASTM C297) before machining and a machined material stiffness after machining. According to present aspects, the machining of the recesses into the composite material substrate is conducted such that the depth, or depth distance, of the recesses machined into the composite substrate material can be a depth ranging from about one-half to about two-thirds of the total thickness of the composite material substrate. That is, by way of non-limiting example, if the total thickness of a composite material substrate is 1.5 inches thick, the depth of the recess machined into the composite material substrate extends from the composite material substrate surface to a depth into the composite material substrate ranging from about 0.75 inches to about 1.0 inches. According to present aspects, by regulating the amount of material removal from the composite material substrate and placement or location of material removal from the composite material substrate, the resulting machined composite material substrate at least retains an overall strength and stiffness that can be substantially similar to the strength and stiffness of a composite material substrate prior to such machining (of the recesses). According to further aspects, and as stated above, depending on many variables and axis being referenced, according to present aspects, actual stiffness-to-weight ratio can be increased to 200% or more before accounting for the eliminated panel weight represented by eliminating the need for formerly required stringers, fasteners, ribs, etc.

When a composite component is made from, or otherwise contains the presently disclosed composite material substrates, that substrates can be fashioned into large panels for large structures including, for example, aircraft wing assemblies. According to present aspects, the machining of a predetermined pattern of recesses machined at predetermined locations and at predetermined depths into the composite material substrate is controlled, such that the composite material substrate provides a reinforcement function to a wing assembly in a manner that obviates the need for discrete reinforcing layers or discrete reinforcing components previously found in wing assemblies (e.g., stringers, frames, fasteners attaching ribs, stringers, frames, etc.). The wing assemblies and composite material substrates disclosed herein, and according to present aspects, obviate the need for the incorporation of aforementioned discrete reinforcing components or discrete reinforcing layers, and, in so doing, reduce the weight of the wing assembly by at least the weight represented by the weight of the obviated reinforcing components.

A significant amount of composite material is removed from the composite material substrates, according to present aspects. The removal of such composite material greatly reduces the weight of the composite material substrate, the composite component that incorporates the composite material substrate, the assemblies comprising the component, and the large finished structures that comprise the assemblies. By way of non-limiting example, an exemplary composite material panel having dimensions of 72 inches (width)×720 inches (length)×1.25 inches (thickness) has a volume of 64,800 in$^3$. According to presently disclosed methods, if a pattern of recesses having dimensions of 7 inches (width)× 22 inches (length)×1 inch (thickness) is removed from the panel, and 240 recesses are machined into the panel, the total amount of material removed equates to 36,960 in$^3$. Such a removal of material therefore results in a volume reduction of about 57% along with a commensurate weight reduction. Such a weight reduction in a structural component (e.g., a wing panel in an aircraft) that is also machined to afford reinforcement while obviating the need for additional internal structural supports and reinforcement (e.g., stringers, frames, fasteners, etc.) is significant. When the composite material substrates and components, according to present aspects, are incorporated into a vehicle, such weight savings can directly translate to lower fuel costs, increased payload, increased vehicle range, etc. The present aspects also significantly reduce component complexity and labor costs for manufacturing and installation, leading to further operational cost savings.

Between illustrated steps 40D and 40E, (Shown in FIGS. 4D and 4E), present aspects contemplate a machining step to machine recesses 45 into the at least partially cured composite material substrate second side 44b' with the recesses formed into the composite material substrate to a predetermined thickness and in a predetermined pattern, with the recesses further each comprising a predetermined geometric profile. The geometric profile is produced by removing a predetermined amount of composite substrate material from the composite material substrate, forming a 3-dimensional recess of a predetermined shape and having a predetermined volume. The geometric profile of each recess in the predetermined pattern of recesses can be the same or can vary, even within the pattern itself, and the individual recess and the overall pattern can be any predetermined shape including a rectangle, an ellipse, a circle, a triangle, a polygon, an irregular shape, or combinations thereof.

FIG. 5 is an overhead view of a machined composite material substrate 44" showing a plurality of recesses 45 machined into the substrate, and in a predetermined pattern 41 of composite material removal from the at least partially cured composite material substrate second side 44b' of at least partially cured composite material substrate 44' to form the recesses 45 in the now machined composite material substrate second side 44b'" of machined composite material substrate 44" (See FIGS. 6A and 6B).

Material removal from the composite material substrate, for example, for the purpose of forming the plurality of recesses, typically can be conducted using a variety of material removal systems (e.g., CNC cutting machine, lasers, etc.). When the number of recesses is significant, and when the total amount of composite material substrate to be removed to form the recesses is large, the typical material removal time can be extremely protracted. That is, the total time required to form the recesses to a preselected and predetermined depth by the typically performed cutting, rastering, ablating, etc. processes or systems can take dozens of hours or days.

By contrast, according to present aspects, the rate of composite substrate material removal from the recesses is significantly increased, and the time required to form the recesses is significantly reduced by implementing presently disclosed aspects. According to present aspects, the composite material substrate is "pretreated" by infiltrating the composite material substrate with an additional detectable material at predetermined locations within the composite material substrate. That is, according to present aspects, a detectable material is introduced or otherwise formed into the composite material substrate during construction of the composite material substrate at a predetermined location within the composite material substrate thickness.

According to further present aspects, the additional detectable material that is introduced or formed into to the composite material substrate forms a "slip plane" that can form an area within the composite material substrate thickness. The slip plane is located within the composite material thickness at a predetermined distance from the composite material upper or second surface. The slip plane is further configured to form the "floor" of the recesses during recess forming processes. According to further aspects, the predetermined distance can be a substantially uniform predetermined distance across the composite material substrate, or the predetermined distance can vary such that the depth of the recesses differ.

According to further aspects, when the perimeter of a preselected area (e.g., a portion of a preselected pattern, for example) is machined to the depth at which the slip plane exists within the composite material substrate thickness, the composite material located above the slip plane will be more easily separated from the remainder of the composite material substrate, and can be removed from the composite material substrate to form the recess in the composite material substrate.

The composite material to be removed from a composite material substrate to form a recess in the composite material substrate can be, according to present aspects, machined and removed in "blocks" of composite material, rather than the progressive rastering that removes small amounts of material and creates an abundance of airborne particulate material. Accordingly, the presently disclosed methods economize the recess-forming stages (e.g., the machining) of the present processes in the composite material substrate, and greatly reduce: 1) the overall cost of the processing; 2) the overall cost of the machined composite material substrate; 4) the cost of components, assemblies, and larger final structures that incorporate the machined composite material substrate; 5) the processing time; etc.

The additional detectable material can be configured, for example, through differing curing protocols, etc., to have a porosity or porosity value that is different from the porosity or porosity value of the surrounding composite material substrate. According to a present aspect, the additional detectable material having a porosity that is different from the porosity of the at least partially cured composite material substrate can be introduced to or formed into the composite material substrate as the composite material substrate is being layed up, in laminate fashion on a molding tool. In this aspect, a first amount of, for example, prepreg plies are layed up to a first composite material substrate first region predetermined thickness. The composite material substrate made from the first amount of prepreg plies is referred to equivalently herein as the composite material substrate "first amount" (e.g., the "first amount" of composite material added to or layed up, for example, on a molding tool) or the composite material substrate "first region". The first amount or first region of composite material substrate has a predetermined porosity value, such as below 0.2% or below 2.0%, when the composite material substrate is at least partially cured.

According to present aspects, the additional detectable material is layed up on or otherwise added to or formed into the first region to substantially cover the first region. The term "additional detectable material" is referred to equivalently and used interchangeably herein as with the terms "second region" or "second region material" or "intermediate layer". Porosity is a result of the material selected for use and the selected processing protocols, including, for example curing protocol differences, etc. In present aspects, the "second region material" can be initially selected to be the same material as the material selected for the "first region". Further, curing condition differences between the first region and second region can create detectable porosity differences between the first region material and second region material. For example, according to present aspects, the second region material can bet cured under a heat blanket, but not in a pressurized environment. Given the lack of pressure while curing, the second region material will display and possess a much greater predetermined porosity and porosity value, than a predetermined porosity and predetermined porosity value of the first region material. The difference between the porosity value of the second region material and the porosity value of the surrounding composite material substrate (e.g., first region) is significant enough such that the difference in the porosity value can be detected by instrumentation applied to non-destructively inspect the at least partially cured composite material substrate (e.g., ultrasound inspection devices, x-ray backscatter inspection devices, etc.).

According to present aspects, the second region material can be applied as a layed up layer and can be a film, including, for example, a fluorinated ethylene propylene (FEP) film having one metallized side. The second region material can further be any material that will not adversely impact the performance of the cured composite material substrate. The second region material can change form or, can interact with adjoining composite material in the composite material substrate. In either aspect, a region is formed that is maintained in place and is discernable according to various differing characteristics that can be detected when the composite material substrate is at least partially cured, with the differing characteristics preferably detectable using non-destructive inspection techniques.

In addition to porosity, a material's transverse Young's modulus can be inspected. According to present aspects, the intermediate material layer can be made from a material having a detectable transverse Young's modulus value ranging, for example, from about 150 ksi to about 550 ksi, while the surrounding composite material substrate in an at least partially cured state can comprise a transverse Young's modulus value ranging from about 1200 ksi to about 1400 ksi.

In another aspect, the second region material comprises a predetermined pattern or the second region material is layed up or otherwise applied to the composite material substrate in a predetermined pattern. That is, present aspects contemplate applying the second region material, or intermediate layer, as a film, with the film comprising a predetermined pattern on the film, and with the second region material comprising areas of the second region material, but not necessarily being present across the entirety of the film. Alternately, according to present aspects, the second region material can be applied onto the composite material substrate via a deposition technique (e.g., spraying, brushing, applying appliques, etc.) for the purpose, according to one aspect, of producing a discontinuous layer of second region material on the composite material substrate in a predetermined pattern. According to further non-limiting aspects, the intermediate layer can include a disbond material that is substantially non-reactive with the surrounding composite material substrate, and can include, for example, a fluorinated ethylene propylene (FEP) film, a polytetrafluoroethylene (PTFE) film, a polyvinyl fluoride (PVF) film, etc.

For purpose of the present disclosure, and according to present aspects, disbonding is the characteristic of inhibiting an adjacent layer to adhere to the substrate to which it was applied. Materials, such as the presently disclosed second region materials and intermediate layers are referred to equivalently and interchangeably herein as "disbond materials" or "disbonding materials" or materials capable of producing regions of "disband" or "disbonding".

According to present aspects, whatever the mode of deposition, or the form of the deposited amount of second region material, after the second region material has been presented or introduced to the composite material substrate, a predetermined pattern area of second region material (also referred to as an intermediate layer and shown in FIG. 6A) is disposed onto the first predetermined thickness of composite material substrate. Accordingly, the location of the second region material (on the surface of the first predetermined thickness of composite material substrate will also will closely approximate or equal the position (e.g., a location) of the "floor" of the recess, after the recess has been machined from the at least partially cured composite material substrate.

According to present aspects, an additional amount of composite material substrate is then layed up over the second region material to a predetermined and predetermined thickness. Once recesses are machined in the at least partially cured composite material substrate, the surrounding walls of the machined recesses will comprise this additional amount of composite material substrate that is deposited onto the second region material, while, as stated above, the floors of the machined recesses will be substantially in the location of the second region material. Further, according to present aspects, the dimension, geometric profile, and location (e.g., position) of the recesses can substantially match the predetermined pattern of second region material.

In another aspect, a predetermined pattern can be selectively at least partially cured or activated into an intermediate layer/second region material to create a morphology in a resin material within the composite material substrate at the resin material/intermediate layer interface that produces the "slip plane". The creation of the "slip plane" (equivalently referred to herein as a "disbond layer") is induced at a predetermined thickness within the composite material substrate) of the composite material substrate located at region of the patterned areas that are at least partially cured at the intermediate layer/second region material interface is fashioned for the purpose of inducing poor adhesion, (referred to equivalently herein as "disbond"). According to present aspects, the "floors" of the recesses to be machined from the composite material substrate will be formed by a disbond material or disbond material layer (e.g. the second material region), with the disbond material layer located within the composite material substrate thickness at the location of the resin material/intermediate layer (second material region) interface and consequently corresponds to the location of the "slip plane".

A further aspect of introducing a slip plane to the composite material substrate and to form a heterogeneous composite material substrate includes providing an intermediate layer to a first amount or "charge" of layed up composite material. According to present aspects, a heterogeneous material refers to the existence of two different material within the composite material substrate (shown in FIG. 6A, for example, as the structure enumerated as 43). In addition, according to present alternate aspects, when the intermediate layer (second region material) is made from a material that is similar to the surrounding composite material substrate first region material, the composite material substrate structure is said to be heterogeneous as the first region and second region material are processed under different conditions (e.g., curing conditions or methods, etc.) such that physical characteristics (e.g., porosity, transverse Young's modulus, etc.) can provide detectable difference to inspection protocols including, for example, non-destructive testing methods, etc.

According to further present aspects, to cure materials that constitute the composite material substrate according to predetermined protocols, a heating device in the form of, for example, a zoned thermoelectric heating, or heating and cooling blanket can be positioned adjacent to the intermediate layer. The zoned heating and cooling blanket can be zoned such that the locations of the predetermined pattern areas (e.g., where the recesses are to be machined) will be heated while the locations outside of the predetermined pattern area will be cooled. When the heating device is powered the future locations of the recesses corresponding to the predetermined pattern are heated to at least partially cure the predetermined areas of the composite material substrate without curing the zones outside of or beyond the predetermined pattern areas. Heat is delivered to the composite material substrate from the heating device such that only a depth into the composite material substrate of a few microns will exhibit a predetermined degree of epoxy-amine polymerization. This degree of cure can be achieved by supplying pulsed power cycles where heat is added or supplied to the composite material substrate in order to prevent the formation of a final cured epoxy-amine resin macromolecules across the surface of the composite material substrate at the intermediate layer/composite material substrate interface that results in poor adhesion of additionally supplied composite material layers at the predetermined pattern areas. This area of poor adhesion creates a localized "slip plane" and disbond region at the predetermined pattern area that will become the floor of the recesses to be machined from the composite material substrate.

In a further aspect, to create detectable disbond areas, or detectable "slip planes" within the composite material substrate (and to form a heterogenous composite material substrate), an intermediate layer is added to a first amount or first charge of composite material, with the intermediate layer subsequently chemically treated at predetermined and patterned areas that correspond closely to the location where recesses are to be machined from the composite material substrate. In one example, a chemical reagent can be applied (e.g., sprayed in aerosol form from, for example, a dedicated device on a contour tape-laying machine (CTLM) head, with the reagent preferentially reacting with amines, epoxies or a catalyst within a predetermined amine-epoxy resin. Further layup of additional composite material is then applied to the intermediate layer as the heterogeneous composite material substrate is completed prior to machining. The reagent promotes a reaction that forms regions of material at the intermediate layer/composite material interface such that an area having a porosity value is formed that is a different than the porosity value of the composite material used to form the composite material substrate.

According to exemplary methodologies presented herein, and according to present aspects, localized slip planes are created during the manufacture of the composite material substrate such that an identifiable and detectable region is created within the thickness of the composite material substrate. The approximate region (e.g., the location) where the slip planes are located within the thickness of the composite material substrate to be machined can be known from the placement of the intermediate layer. According to present aspects, the region of the slip plane can be determined by non-destructively inspecting the thickness of the composite material substrate, such as by determining the porosity of the thickness and determining the location within the composite material substrate thick where a change in porosity exists. That is, according to present aspects, the difference in porosity value (or the difference in other perceptible characteristics) between the intermediate layer porosity value (e.g., the slip plane region porosity value) and the composite material porosity value can be determined with accuracy by employing, for example, ultrasound techniques, x-ray backscatter techniques, etc. that are used in conjunction or that otherwise feed data to material removal devices. For example, once the location of the intermediate layer/slip plane region is determined through an inspection process, the determined location is supplied to the material removal device and material is removed from the composite substrate material to a thickness where the slip plane exists. The predetermined and location of the recesses to be machined are determined and the material removal device removes composite material from the composite material substrate about the perimeter of the recess to be machined from the composite material substrate. Since the "floor" of the recess lies in the slip plane, a disbonding of the composite material in the slip plane region facilitates the removal of the composite material to form the recess, as the composite material can be removed from the recess (e.g., to form the recess) in large sections, or even in a substantially unitary piece of composite material, once the machining of the perimeter adequately "loosens" or "frees" the "block" of composite material that is to be removed from the composite material substrate for the purpose of creating a predetermined pattern of recesses in the composite material substrate.

Porosity differences of the magnitude of 0.2% can be detected. Porosity under 2.0% is generally acceptable. According to present aspects, for panels cured in an autoclave, porosity of less than 0.2% (e.g., representing no detectable porosity) is typical. For the thin layer of "second region material" that can be cured via heat blanket outside of the autoclave, porosity in the range of 2.0 through 10.0% is anticipated. The detection of material porosity and porosity value differentials have been discussed herein in terms for the purpose of determining areas of disbond within the composite material substrates (e.g., the location of the intermediate layer or region interface where the areas of disbond occur within the composite material substrate thickness).

According to present aspects, characteristics other than porosity can be determined using various non-destructive inspection techniques. For example, to determine the location of the thin layer of second region material, techniques, systems and apparatuses for measuring transverse Young's modulus of materials can be used. In a non-limiting example, present aspects contemplate the intermediate layer, or second region, being made from a material having a transverse Young's modulus value ranging from about 150 ksi to about 550 ksi, while the surrounding composite material substrate and has a transverse Young's modulus value ranging from about 1200 ksi to about 1400 ksi.

Present aspects of improved material removal from the composite material substrate are shown in FIGS. 6A and 6B. FIG. 6A is a partial cross-sectional view of the at least partially cured composite material substrate 44'. As shown in FIG. 6A, a material removal device 62 is shown in the form of a CNC cutting machine, although present aspects contemplate the use of any material removal or cutting device including, for example, a laser, a drill, etc. According to present aspects the material removal device 62 can be in communication with a controller 64 that can, in turn, be in communication with a processor 66 that can be programmed to deliver a signal to the controller 64 that can control the material removal device 62 for the purpose of, for example, cutting into the at least partially cured composite material second side 44b' (to form the machined composite material second side 44b" of machined composite material 44") to a predetermined distance or predetermined thickness according to a programmed value inputted, for example, at a processor input 68 and controlled by the controller 64 to form a plurality of recesses 45 that are formed into a predetermined pattern of recesses in the at least partially cured composite material substrate. In an alternate aspect, the material removal device 62 is in communication with the processor 66 and the processor includes an integrated controller 67. As shown in FIG. 6A the intermediate layer 47 comprises the second region material that is detected according to present aspects, and that forms a disbond region that can be a disbond pattern area 61 that facilitates removal of the composite material to form the recesses, and that resides at the "floor" of the recesses. Though not shown in FIG. 6A, present aspects further contemplate the further incorporation of a non-destructive inspection apparatus (e.g., an ultrasound probe, ultrasound receiver, ex-ray backscatter apparatus, etc.) in communication with the controller and/or the processor for the purpose of scanning the composite material substrate, determining the location of the slip plane (based, for example, on the aforementioned perceived material porosity variances), sending signals to the controller and/or the processor, and regulating the material removal process, with the result being the predetermined creation of a pattern of recesses machined to a predetermined thickness in the composite material substrate that, corresponds to the location of the slip plane/intermediate layer region.

FIG. 6B shows an overhead plan view of a machined composite material substrate 44" with recess 45 machined into the substrate in a predetermined pattern, and to a predetermined thickness, with individual recesses 45 formed or to be formed in the substrate such that, according to present aspect, the recesses 45 are of a substantially predetermined uniform dimension. Although not shown in FIGS. 6A and 6B, the recesses can each have a varying dimension and the recesses can each have the same or different geometric profiles. That is, although not shown, according to further aspect, the recesses can be formed such that the dimension of recesses change with respect to one another, or the dimension of at least one of the recesses changes relative to the rest of the recesses, and according to a predetermined pattern.

As further shown in FIG. 6B, the recess perimeter 45a of recess 45 has been machined into the machined composite material substrate 44", such that a composite material "plug" 44c has been freed from the machined composite material substrate 44" and can now be removed in a substantially whole piece. Machined composite material substrate 44" also represents the heterogeneous material enumerated as 43.

According to further aspects not shown, when a CNC cutting device is used to accomplish the recess-forming composite material removal, and, for example, ultrasound is used as the non-destructive inspection process modality, a drill bit used to perform the cutting can comprise an ultrasound horn and detector, as the mechanical vibrations caused by the milling can occur in a different frequency regime than ultrasound. The ultrasound is positioned and directed to detect the position of the intermediate layer. In further aspects, the ultrasound device will detect the position of the intermediate layer that will serve as the "floor" of the recess to be removed from the composite material substrate. The ultrasound device can be located at a predetermined specific distance from the material removal device that can be zero in some cases, such that, for example, a drill bit can be positioned based on a relative movement from where an ultrasound head detected the intermediate material (e.g., the "slip plane" region, etc.).

As mentioned above, when the intermediate layer is provided as a thin layer comprising curing a predetermined pattern into the intermediate layer (e.g., curing conducted outside of autoclave) such curing of the intermediate layer can result in a higher porosity, or greater porosity value in the thin intermediate layer that can be detected by, for example, ultrasound, since the porosity value of the cured intermediate layer or cured regions of the intermediate layer will be perceptibly different from the porosity value of the surrounding composite material substrate. According to present aspects, through an integrated controller or when in communication with a controller, a drill bit, for example, can be configured to respond to the detected porosity value change/difference and can extend into the composite material thickness to a depth of the location of the intermediate layer.

By way of example, and according to present aspects, the presently disclosed machining advantages are significant. For example, typical material removal techniques for forming a recess or pattern of recesses in a composite material include rastering back and forth a ½ inch drill bit set to drill to a depth of about 1 inch when the overall thick ness of the composite material substrate is about 1.5 inches. If a 7 inch wide recess is desired, the drill bit will be rastered back and forth about 9 times. If each recess is 22 inches in length, the rastering would constitute a total cutting length of approximately 9 in×2×22 in for a total cutting distance per recess of 396 inches of drill bit movement. At a drill bit movement rate of about 30 in/minute, the composite material removal rate per recess is estimated to be about 12.8 minutes to remove the 12 in$^3$ of composite material to form the predetermined recess.

In contrast to the typical rastering/machining rates and times described above, according to present aspects, removing the same amount of material to form each similarly sized recess with even a ¼ inch drill bit, but only drilling around the perimeter of the recess, but to a similar depth is only 2×7 inches (width)+2×22 inches (length), or 58 inches of drill bit movement. This results in a reduction of material removal time for each recess of from 12.8 minutes to 2 minutes (assuming the same drill bit movement rate of about 30 in/minute). In addition, by only needing to drill the perimeter of the recess and remove the composite material substrate "plug" or "block" to form the recess, significantly less particulate material is created that consequently improves workplace safety with respect to atmospheric particulate content. This can be of concern when the composite material being removed to form the recesses comprises a carbon-fiber epoxy amine resin. Significantly mitigating or substantially eliminating the formation of carbon-fiber epoxy amine resin dust and particulate enhances workplace safety and eliminates the amount of particulate material that is generated, collected, and/or disposed of.

Further, considering that a large composite component may possess as many as 240 recesses (e.g., in a wing-sized aircraft wing panel), the time savings afforded by present aspects is significant. For example, in the example given above, more than 43 hours of time would be saved by the applying the methods of the present aspects as opposed to removing composite material using typical rastering methods, or a machining reduction time of about 84%. With respect to, for example, composite wing components and assemblies, the components formed according to present aspects, as well as their method of manufacture result in substantial cost and time savings over typical components and the typical methods of their manufacture.

In addition, since present aspects significantly decrease the amount of drilling or other machining required, the cost for the need to replace, repair, service, etc., machinery and machinery components (e.g., drill bits, etc.) and the cost of power required to run and power machinery (e.g. lasers, etc.) are also greatly reduced. Further, present aspects allow for smaller drill bits to be used to drill out a recess perimeter (e.g., as compared to the larger drill bits typically used for rastering) resulting in a further cost savings as the smaller (e.g. ¼ inch) bits are typically less expensive than the larger (½ in or larger) bits.

FIGS. 7, 8, and 9 are perspective views of machined composite material substrates, according to present aspects, where the recesses are shown having various geometric profiles. As shown in FIG. 7, a machined composite material substrate 44" comprising a machined composite material substrate second surface 44b'", into which a pattern of recesses 45 (having recess perimeters 45a) have been machined to a predetermined thickness for the purpose of removing a predetermined amount of substrate material from the substrate. As shown in FIG. 7, the recesses exhibit a geometric profile of an ellipse, although according to present aspects, any predetermined geometric profile can be machined into the substrate to form a predetermined pattern of recesses having any desired geometric profile.

For example, as shown in FIG. 8, a machined composite material substrate 44" comprising a machined composite material substrate second surface 44b'", into which a pattern of recesses 45 (having recess perimeters 45a) have been machined to a predetermined thickness for the purpose of removing a predetermined amount of substrate material from the substrate. As shown in FIG. 8, the recesses exhibit a geometric profile of a plurality of triangles, although according to present aspects, any predetermined geometric profile can be machined into the substrate to form a predetermined pattern of recesses having any desired geometric profile.

By way of a further example, as shown in FIG. 9, a machined composite material substrate 44" comprising a machined composite material substrate second surface 44b'", into which a pattern of recesses 45 (having recess perimeters 45a) have been machined to a predetermined thickness for the purpose of removing a predetermined amount of substrate material from the substrate. As shown in FIG. 9, the recesses exhibit a geometric profile of a rectangle (e.g., a rectangle in the form of a "square"), although according to present aspects, any predetermined geometric profile can be machined into the substrate to form a predetermined pattern of recesses having any desired geometric profile.

According to present aspects, including, for example, those shown in FIGS. 7, 8, and 9, the recesses machined into the at least partially cured composite material substrate can be manufactured according to any predetermined pattern and each recess can be machined to individually have any predetermined geometric profile such that the machined component can be tailored to achieve a predetermined strength, stiffness, etc. according to required performance standards for the components that are manufactured according to present aspects. Having the ability to tailor strength and stiffness along the area of a large component, such as, for example, for an aircraft, spacecraft, rotorcraft, etc., can assist in the design and manufacturing of large structures to address emerging issues regarding aerodynamic response including, for example, flutter.

FIGS. 10A, 10B, and 11 are flowcharts outlining methods according to further aspects of the present disclosure. As shown in FIG. 10A, a method 100A according to present aspects is outlined including orienting 102 a plurality of composite material layers onto a tool to form a composite material substrate. According to present aspects, the composite material substrate can comprise a composite material substrate thickness, and the tool can be a molding tool that can comprise a tooling surface, with the composite material substrate further comprising a composite material substrate first surface and a composite material substrate second surface, and with the composite material substrate first surface positioned proximate to the tooling surface. The method 100 outlined in FIG. 10A further shows introducing 104 a predetermined pattern area to the composite material substrate at a predetermined location within the composite material substrate, and at least partially curing 106 the composite material substrate, and removing 108 a predetermined amount of at least partially cured composite material with a material removing device from the at least partially cured composite material substrate to form recesses in the location of the predetermined pattern area. According to present aspects, and as disclosed above, the material removal device can be a CNC machine, a laser, a drill, or other mechanical cutting device, etc., or combinations thereof.

As shown in FIG. 10B, a method 100B according to present aspects is outlined including orienting 102 a plurality of composite material layers onto a tool to form a composite material substrate. According to present aspects, the composite material substrate can comprise a composite material substrate thickness, and the tool can be a molding tool that can comprise a tooling surface, with the composite material substrate further comprising a composite material substrate first surface and a composite material substrate second surface, and with the composite material substrate first surface positioned proximate to the tooling surface. The method 100B outlined in FIG. 10B further shows introducing 104 a predetermined pattern area to the composite material substrate at a predetermined location within the composite material substrate, and at least partially curing 106 the composite material substrate. As shown in FIG. 10B, the method 100B includes at least partially curing 107 the predetermined pattern into a portion of the composite material substrate. The method 100B shown in FIG. 10B further includes removing 108 a predetermined amount of at least partially cured composite material with a material removing device from the at least partially cured composite material substrate to form recesses in the location of the predetermined pattern area. According to present aspects, and as disclosed above, the material removal device can be a CNC machine, a laser, a drill, or other mechanical cutting device, etc., or combinations thereof.

As shown in FIG. 10C, a method 100C according to present aspects is outlined including orienting 102 a plurality of composite material layers onto a tool to form a composite material substrate. According to present aspects, the composite material substrate can comprise a composite material substrate thickness, and the tool can be a molding tool that can comprise a tooling surface, with the composite material substrate further comprising a composite material substrate first surface and a composite material substrate second surface, and with the composite material substrate first surface positioned proximate to the tooling surface. The method 100C outlined in FIG. 10C further shows introducing 104 a predetermined pattern area to the composite material substrate at a predetermined location within the composite material substrate by chemically treating 105 a region of the composite material substrate to form a second region to form a chemically-treated second region, and at least partially curing 106 the composite material substrate. The method 100C shown in FIG. 10C further includes removing 108 a predetermined amount of at least partially cured composite material with a material removing device from the at least partially cured composite material substrate to form recesses in the location of the predetermined pattern area. According to present aspects, and as disclosed above, the material removal device can be a CNC machine, a laser, a drill, or other mechanical cutting device, etc., or combinations thereof.

A non-limiting listing of chemical agents considered for use in reacting with the epoxy-amines in the composite material substrate to create the disbond area within the composite material substrate can include, for example, methanol, carboxylic acid, formaldehyde, formic acid, carbon dioxide, etc. These chemical agents can react with amine groups at room temperature and in some cases the predetermined reactions can require the presence of metals as photocatalysts. While being bound to no particular theory, it is believed that these chemical agents will exhaust substantially all of the local amine monomers prior to the epoxy-amine reaction occurring (at elevated temperature) will result in the formation of a slip plane as the strong, large dendrimeric macromolecule is not formed across the region with no available amine groups. Further, aromatic amines and aliphatic amines, typically present in "five-minute" epoxies, can react with epoxide groups at room temperature and substantially exhaust the local epoxide groups prior to the epoxy-amine reaction occurring (at elevated temperature) and will result in the formation of a slip plane for a reason similar to that stated above.

As shown in FIG. 11 and according to present aspects, a method 200 is outlined including providing 202 a heterogeneous composite material substrate having a composite material substrate (e.g., a first region material) and an intermediate layer (e.g., a second region material), and at least partially curing 204 a predetermined area of the composite material substrate. The method 200 further includes orienting 206 a material removal device proximate to the composite material substrate and determining 208 the location of the composite material substrate/intermediate layer interface (e.g., the first region material/second region material interface), followed by removing 210 a predetermined amount of at least partially cured composite material substrate and forming 212 a predetermined pattern of recesses in the composite material substrate. As with methods 100A, 100B, 100C, and method 200 described above and as according to present aspects, the material removal device can be a CNC machine, a laser, a drill, or other mechanical cutting device, etc., or combinations thereof. The intermediate layer can be introduced into the composite material substrate to form the heterogeneous composite material as the heterogeneous composite material substrate is layed up, with the intermediate layer introduced at a predetermined distance into the heterogeneous composite material substrate. According to further aspects, the predetermined distance at which the intermediate layer is located can be a substantially uniform predetermined distance across the heterogeneous composite material substrate, or the predetermined distance can vary such that the depth of the recesses (the location of the slip plane and, consequently, the location of the recess "floors") differ from one recess to another.

FIG. 12 outlines a method 300 according to present aspects including providing 202 a heterogeneous composite material substrate having a composite material substrate (e.g., first region material) and an intermediate layer (e.g., second region material), and at least partially curing 204 a predetermined area of the composite material substrate. The method 300 further includes orienting 206 a material removal device proximate to the composite material substrate and determining 208 the location of the composite material substrate/intermediate layer interface (e.g., the first region material/second region material interface). Method 300 as outlined further includes activating 302 the material removal device and directing 304 the material removal device about a perimeter of a predetermined pattern area of the composite material substrate that corresponds to a predetermined pattern area introduced to the composite material substrate by an intermediate layer. The method 300 further includes removing 306 a predetermined amount of composite material substrate from the perimeter of the predetermined pattern area and removing 308 composite material within the perimeter to form a recess. As with methods 100A, 100B, 100C, and method 200 described above and as according to present aspects, the material removal device of method 300 can be a CNC device, a laser, a drill, or other mechanical cutting device, etc., or combinations thereof.

FIG. 13 outlines a method 400 according to present aspects comprising providing 402 a composite material substrate comprising a composite material substrate surface, with the composite material substrate further comprising a composite material first region comprising a first porosity, introducing 404 a second region to the composite material substrate, said second region comprising a second porosity, forming 406 a disbond area at a composite material substrate first region/second region interface. The method 400 further comprises orienting 408 a material removal device proximate to the composite material substrate surface, non-destructively determining 410 a location of the composite material substrate first region/second region interface, removing 412 an amount of the composite material substrate first region extending from the composite material substrate surface to the composite material substrate first region/second region interface, and forming 414.

FIG. 14 outlines a method 500 according to present aspects set forth in method 400 shown in FIG. 13, with method 500 further comprising at least partially curing 502 a predetermined area of the composite material substrate first region to form an at least partially cured predetermined area of the composite material substrate first region, said at least partially cured predetermined area of the composite material substrate first region configured to extend from the composite material substrate surface to the composite material first region/second region interface.

FIG. 15 outlines a method 600 according to present aspects set forth in methods 400, 500 shown in FIGS. 13, 14, respectively, with method 600 further comprising removing 602 an amount composite material substrate from the composite material substrate first region to form a perimeter around a predetermined area, said perimeter extending from the composite material substrate surface to the composite material substrate first region/second region interface to form a composite material substrate plug within the perimeter, sand removing 604 the composite material plug to form a recess in the composite material substrate, said recess comprising a recess floor located at the composite material substrate first region/second region interface.

The presently disclosed aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed:

1. A method comprising:
    providing a composite material substrate comprising a composite material substrate surface, said composite material substrate further comprising a composite material first region comprising a first porosity;
    introducing a second region to the composite material substrate, said second region comprising a second porosity; and
    forming a disbond area at a composite material substrate first region/second region interface;
    orienting a material removal device proximate to the composite material substrate surface;
    non-destructively determining a location of the composite material substrate first region/second region interface;
    removing an amount of the composite material substrate first region extending from the composite material substrate surface to the composite material substrate first region/second region interface; and
    forming a plurality of recesses in the composite material substrate.

2. The method of claim 1, further comprising:
    at least partially curing a predetermined area of the composite material substrate first region to form an at least partially cured predetermined area of the composite material substrate first region, said at least partially cured predetermined area of the composite material substrate first region configured to extend from the composite material substrate surface to the composite material first region/second region interface.

3. The method of claim 1, further comprising forming a localized slip plane at the composite material substrate first region/second region interface.

4. The method of claim 1, further comprising:
    removing an amount composite material substrate from the composite material first region to form a perimeter around a predetermined area, said perimeter extending from the composite material substrate surface to the composite material substrate first region/second region interface to form a composite material substrate plug within the perimeter.

5. The method of claim 4 further comprising:
    removing the composite material plug to form a recess in the composite material substrate, said recess comprising a recess floor located at the composite material substrate first region/second region interface.

6. The method of claim 1, said material removal device comprising at least one of a laser and a CNC device.

7. The method of claim 1, wherein the material removal device is in communication with a controller, said controller in further communication with an ultrasound receiver.

8. The method of claim 1, in the step of introducing a second region to the composite material substrate, further comprising chemically treating said second region with a chemical reagent to form the disbond area at a composite material substrate first region/second region interface.

9. The method of claim 8, wherein the chemical agent is at least one of a fluorinated ethylene propylene-containing film, a polytetrafluoroethylene-containing film, a polyvinyl fluoride-containing film, and combinations thereof.

10. A composite laminate comprising:
    a composite material substrate comprising a composite material first region and a composite material substrate surface, said composite material substrate configured to comprise a plurality of recesses extending from the composite material substrate surface to a predetermined distance from the composite material substrate surface into the composite material substrate, said plurality of recesses comprising a predetermined dimension;
    an intermediate layer disposed at a predetermined depth within the composite material substrate to form a composite material substrate first region/second region interface;
    wherein said plurality of recesses are bounded by surrounding composite material substrate and the intermediate layer; and
    wherein said intermediate layer comprises a disbond region at the composite material substrate first region/second region interface.

11. The composite laminate of claim 10, wherein the composite material substrate in the composite material first region comprises a porosity of less than about 0.2%, said second region comprising a second region material, said second region material comprising a porosity ranging from about 2.0% to about 10%.

12. The composite laminate of claim 10, wherein the composite material substrate comprises:
a fiber-containing epoxy-based composite material.

13. The composite laminate of claim 10, wherein the composite material substrate comprises
a carbon fiber-containing epoxy-based composite material.

14. The composite material of claim 10, said composite material substrate first region comprising at least one of a partially cured fiber-reinforced epoxy-based composite material and a fully cured fiber-containing epoxy-based composite material.

15. The composite laminate of claim 10, wherein the intermediate layer comprises at least one of fluorinated ethylene propylene, polytetrafluoroethylene, polyvinyl fluoride, and combinations thereof.

16. The composite laminate of claim 10, wherein the plurality of recesses forms a pattern of recesses.

17. The composite material of claim 16, wherein the plurality of recesses comprises at least one recess comprising a recess volume that varies from the recess volume of another of the plurality of recesses.

18. A vehicle comprising the composite laminate of claim 10.

19. The vehicle of claim 18, wherein the vehicle comprises at least one of a manned aircraft, an unmanned aircraft, a manned spacecraft, an unmanned spacecraft, a manned rotorcraft, an unmanned rotorcraft, a manned terrestrial vehicle, an unmanned terrestrial vehicle, a manned surface water borne vehicle, an unmanned surface water borne vehicle, a manned sub-surface waterborne vehicle, an unmanned sub-surface waterborne vehicle, and combinations thereof.

20. An aircraft wing assembly comprising:
a composite material substrate comprising a composite material first region and a composite material substrate surface, said composite material substrate configured to form an aircraft wing assembly, said composite material further configured to comprise a plurality of recesses extending from the composite material substrate surface to a predetermined distance from the composite material substrate surface into the composite material substrate, said plurality of recesses comprising a predetermined dimension;
an intermediate layer disposed at a predetermined depth within the composite material substrate to form a composite material substrate first region/second region interface;
wherein said plurality of recesses are bounded by surrounding composite material substrate and the intermediate layer; and
wherein said intermediate layer comprises a disbond region at the composite material substrate first region/second region interface.

* * * * *